United States Patent [19]

Bedard et al.

[11] Patent Number: 4,484,295

[45] Date of Patent: Nov. 20, 1984

[54] CONTROL CIRCUIT AND METHOD FOR VARYING THE OUTPUT OF A WAVEFORM GENERATOR TO GRADUALLY OR RAPIDLY VARY A CONTROL SIGNAL FROM AN INITIAL VALUE TO A DESIRED VALUE

[75] Inventors: James F. Bedard; Charles W. Eichelberger, both of Schenectady; Salvator F. Nati, Jr., Syracuse, all of N.Y.

[73] Assignee: General Electric Company, Schenectady, N.Y.

[21] Appl. No.: 267,330

[22] Filed: May 26, 1981

[51] Int. Cl.³ .......................... G05F 1/12; G05F 1/48; G05B 24/02

[52] U.S. Cl. .................................... 364/607; 323/322; 323/350; 323/354; 364/480; 330/282

[58] Field of Search ............... 364/718, 719, 607, 480; 330/144, 145, 120, 282, 284, 285, 286; 323/280, 322, 350, 354

[56] References Cited

U.S. PATENT DOCUMENTS

| | | | |
|---|---|---|---|
| 3,579,138 | 5/1971 | Harris | 330/282 X |
| 3,810,035 | 5/1974 | Gundry | 330/282 X |
| 3,883,815 | 5/1975 | Grundy | 330/144 X |
| 3,991,301 | 11/1976 | Chaprnka | 364/607 |
| 4,048,576 | 9/1977 | Blackburn et al. | 330/284 |
| 4,079,334 | 3/1978 | Hamilton | 330/282 X |
| 4,110,708 | 8/1978 | Mendenhall | 330/282 X |
| 4,132,957 | 1/1979 | Hekimian et al. | 330/282 X |
| 4,176,398 | 11/1979 | Rider | 364/607 |
| 4,292,596 | 9/1981 | Ishizuka et al. | 330/282 X |
| 4,363,001 | 12/1982 | Suzuki et al. | 330/284 X |

FOREIGN PATENT DOCUMENTS

| | | | |
|---|---|---|---|
| 5443822 | 4/1981 | Japan | 330/284 |

*Primary Examiner*—Felix D. Gruber

*Attorney, Agent, or Firm*—Nathan D. Herkamp; Philip L. Schlamp; Fred Jacob

[57] ABSTRACT

Methods for operating a control circuit, having a programmable signal characteristic, in a manner so as to gradually vary a D.C. analog output level from an initial value to a final value, as well as for abrupt changes therein, when an isolation-and-rectification network is used to recover a D.C. voltage of programmably controlled amplitude. The methods also provide for a pulsed output condition in a circuit for providing a periodic signal of programmably controlled amplitude. In such a circuit, the output signal amplitude may be controlled by external data signals to values less than, equal to and greater than, the substantially constant amplitude of an oscillator waveform. Both programmable (computer-controlled) and hard-wired circuitry are disclosed for controlling the output signal by the methods of this invention.

10 Claims, 32 Drawing Figures

FROM/TO CENTRAL CONTROLLER
214d
TO OTHER SWITCH LEGS
INT OSC
ADDR
SWITCH
ENABLE
TRD
RRD
Vcc
RST
214
216
220
228
230
232

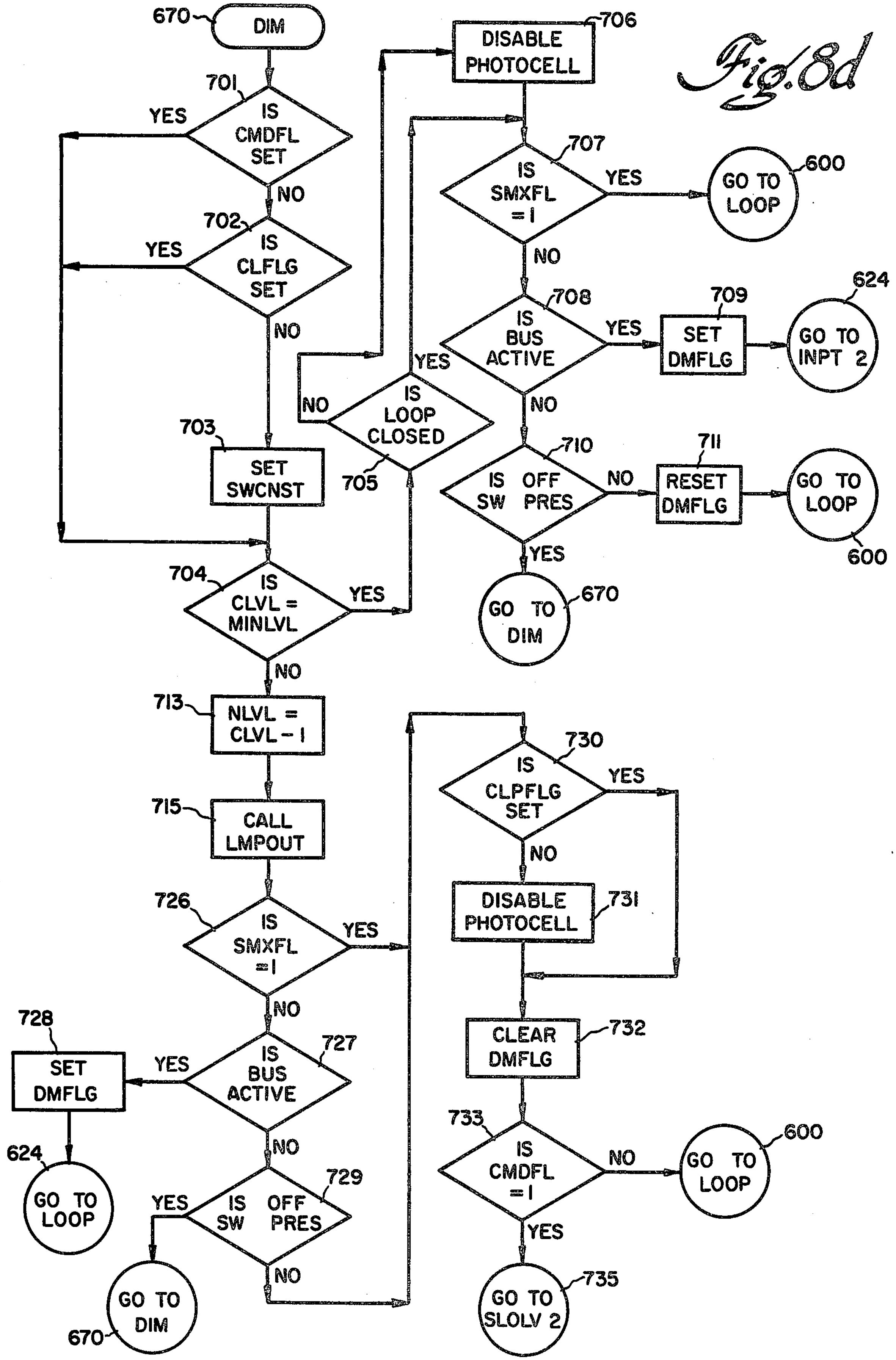
Fig. 8d
670
DIM
701
IS CMDFL SET
YES
NO
702
IS CLFLG SET
YES
NO
703
SET SWCNST
704
IS CLVL = MINLVL
YES
NO
705
IS LOOP CLOSED
YES
NO
706
DISABLE PHOTOCELL
707
IS SMXFL =1
YES
NO
GO TO LOOP
600
708
IS BUS ACTIVE
YES
NO
709
SET DMFLG
624
GO TO INPT 2
710
IS OFF SW PRES
NO
YES
711
RESET DMFLG
GO TO LOOP
600
GO TO DIM
670
713
NLVL = CLVL - I
715
CALL LMPOUT
726
IS SMXFL =1
YES
NO
727
IS BUS ACTIVE
YES
NO
728
SET DMFLG
624
GO TO LOOP
729
IS SW OFF PRES
YES
NO
GO TO DIM
670
730
IS CLPFLG SET
YES
NO
731
DISABLE PHOTOCELL
732
CLEAR DMFLG
733
IS CMDFL =1
NO
YES
GO TO LOOP
600
GO TO SLOLV 2
735

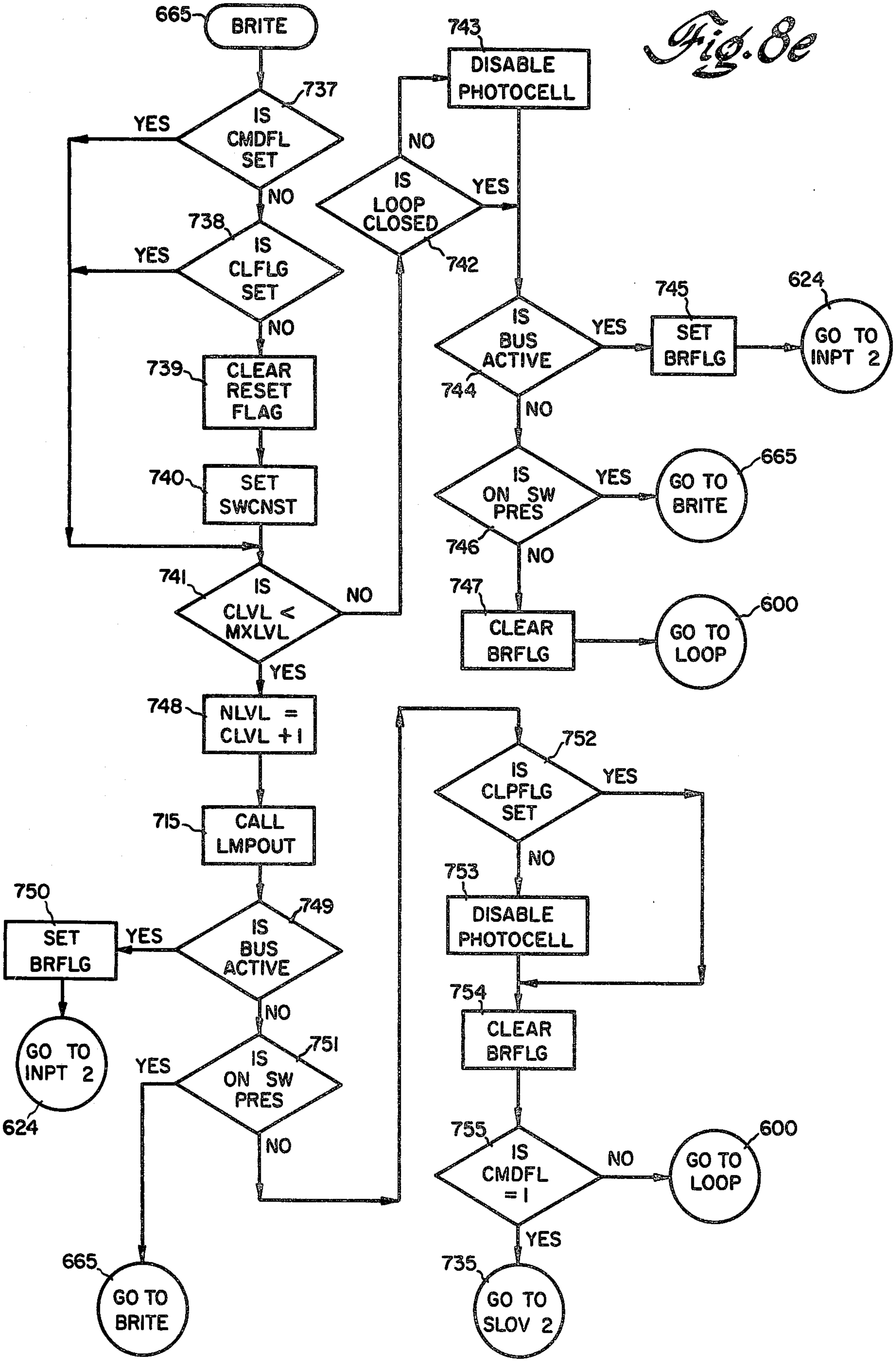
Fig. 8e
665
BRITE
737
IS CMDFL SET
YES
NO
738
IS CLFLG SET
YES
NO
739
CLEAR RESET FLAG
740
SET SWCNST
741
IS CLVL < MXLVL
NO
YES
748
NLVL = CLVL + 1
715
CALL LMPOUT
749
IS BUS ACTIVE
YES
NO
750
SET BRFLG
GO TO INPT 2
624
751
IS ON SW PRES
YES
NO
665
GO TO BRITE
742
IS LOOP CLOSED
NO
YES
743
DISABLE PHOTOCELL
744
IS BUS ACTIVE
YES
NO
745
SET BRFLG
624
GO TO INPT 2
746
IS ON SW PRES
YES
NO
665
GO TO BRITE
747
CLEAR BRFLG
600
GO TO LOOP
752
IS CLPFLG SET
YES
NO
753
DISABLE PHOTOCELL
754
CLEAR BRFLG
755
IS CMDFL = I
NO
YES
600
GO TO LOOP
735
GO TO SLOV 2

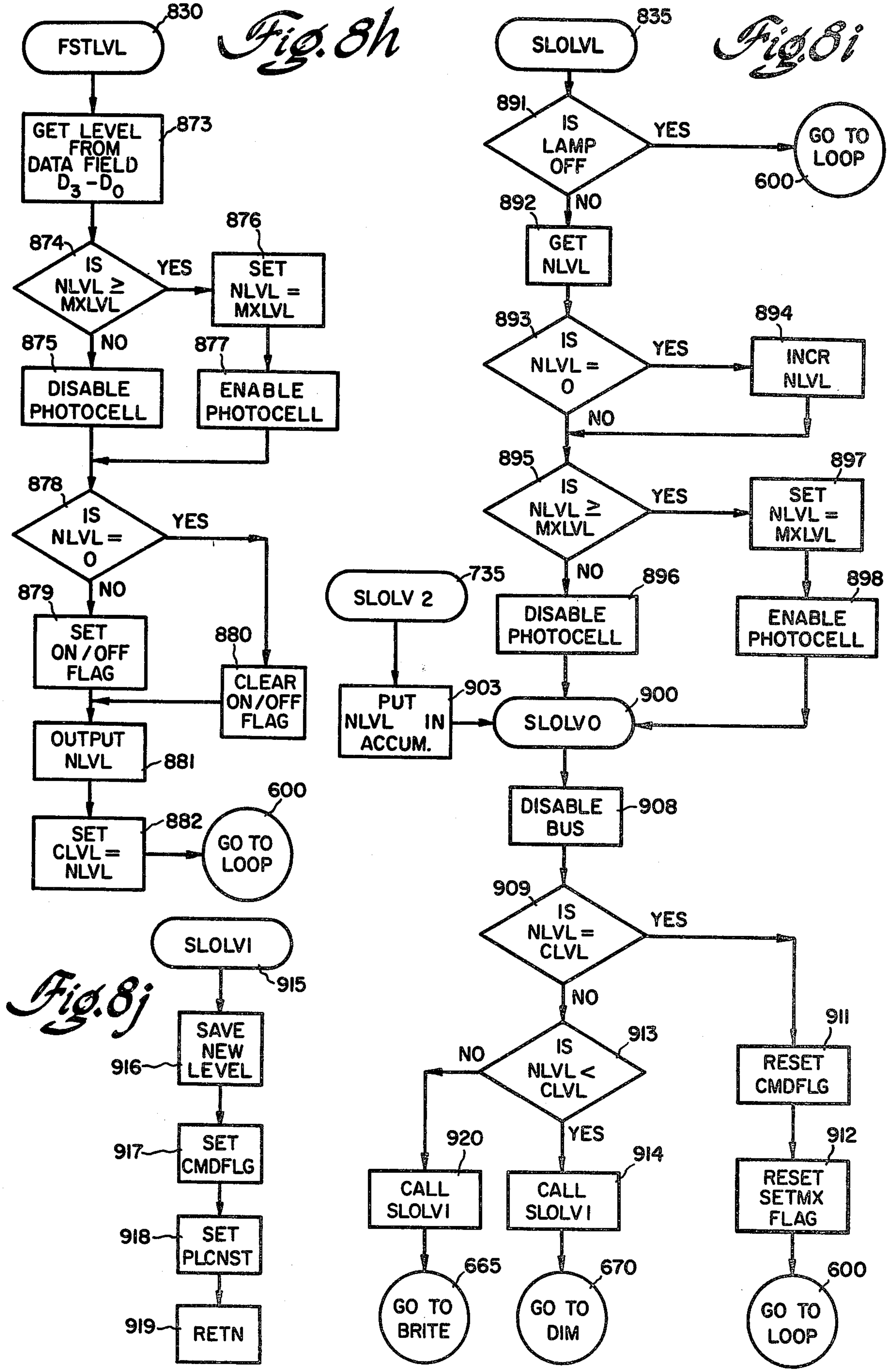
Fig. 8h
FSTLVL
830
GET LEVEL FROM DATA FIELD $D_3 - D_0$
873
874
IS NLVL ≥ MXLVL
YES
NO
876
SET NLVL = MXLVL
875
DISABLE PHOTOCELL
877
ENABLE PHOTOCELL
878
IS NLVL = 0
YES
NO
879
SET ON / OFF FLAG
880
CLEAR ON/OFF FLAG
OUTPUT NLVL
881
SET CLVL = NLVL
882
GO TO LOOP
600
Fig. 8i
SLOLVL
835
891
IS LAMP OFF
YES
GO TO LOOP
600
NO
892
GET NLVL
893
IS NLVL = 0
YES
894
INCR NLVL
NO
895
IS NLVL ≥ MXLVL
YES
897
SET NLVL = MXLVL
NO
896
DISABLE PHOTOCELL
898
ENABLE PHOTOCELL
SLOLV 2
735
PUT NLVL IN ACCUM.
903
SLOLVO
900
DISABLE BUS
908
909
IS NLVL = CLVL
YES
NO
911
RESET CMDFLG
912
RESET SETMX FLAG
600
GO TO LOOP
913
IS NLVL < CLVL
NO
YES
920
CALL SLOLVI
914
CALL SLOLVI
665
GO TO BRITE
670
GO TO DIM
Fig. 8j
SLOLVI
915
916
SAVE NEW LEVEL
917
SET CMDFLG
918
SET PLCNST
919
RETN

CONTROL CIRCUIT AND METHOD FOR VARYING THE OUTPUT OF A WAVEFORM GENERATOR TO GRADUALLY OR RAPIDLY VARY A CONTROL SIGNAL FROM AN INITIAL VALUE TO A DESIRED VALUE

BACKGROUND OF THE INVENTION

The present invention relates to waveform control circuits and, more particularly, to novel methods for operating programmable signal control circuits to provide a desired output therefrom.

In many forms of remotely-controlled systems, it is desirable to transmit information by means of varying the amplitude of a D.C. level or by varying a characteristic (amplitude, frequency, phase, pulse-width, etc.) of an A.C. waveform. Frequently, the circuit controlling the modulated characteristic of the signal requires many costly components, detracting from the advantageous use thereof in high-volume systems. In particular, with the present emphasis upon energy conservation it is desirable to provide a remotely-programmable lighting system, and especially such a system wherein maximum light level in an area can be set, such that individual users can not control the variable light output in their area to a greater value than the pre-established maximum. In such a system, it is also desirable that other values of light output, below the pre-established maximum, can be easily, and preferably linearly, set by the individual user. Further, it is highly advantageous that area lighting system output be under programmable control, such as from a microcomputer and the like at a central facility. Additionally, in such systems, the lighting loads are often connected to a powerline, that the control electronics be capable of being isolated from the relatively high-voltage powerlines for reasons of personal safety.

It is also highly desirable to be able to operate the signal characteristic (e.g. amplitude) control circuit in such a manner that immediate changes in lighting level can be effected, such as when the lighting is initially turned on or is turned off to a zero output value, yet still allow operation of the load with a gradual change in output between any selected pair of discrete levels. Accordingly, a programmable signal characteristic control circuit and methods for achieving abrupt and/or gradual changes in output level thereof, are highly desirable.

BRIEF SUMMARY OF THE INVENTION

In accordance with the invention, a programmable signal characteristic control method utilizes an A.C. waveform having a plurality of characteristics maintained at substantially constant levels, with an additional signal characteristic being varied to provide a variable control signal.

Circuitry is disclosed wherein internally-provided or externally-provided control signals may be utilized to abruptly change the output level, or may effect a gradual change between two selected ones of a preselected plurality of distinct levels, by operation such that an increasing number of oscillator waveform cycles in a time interval (having a fixed number of cycles therein) are transmitted with the final-value and the remainder of the waveform cycles of each time interval are transmitted with the initial value, to gradually change the output level, e.g. a D.C. voltage amplitude, to the subsequent load.

A hard-wired logic circuit is disclosed for effecting the gradual change from a present output signal level to a new signal level by counting an increasing number of the oscillator waveform cycles in each time interval, in automatic fashion responsive to a single start signal.

In the presently preferred embodiment of the present invention, programmable control, by a set of outputs of a microcomputer, is used to provide a variable amplitude waveform capable of either abrupt or gradual changes, and with an additional microcomputer output being utilized to provide a pulse waveform output when the load is to be controlled to a zero output level (off) condition.

Accordingly, it is one object of the present invention to provide novel methods for operating a programmable signal characteristic control circuit to effect either abrupt or gradual changes in the output level thereof.

It is another object of the present invention to provide novel programmable signal amplitude control circuits using these methods.

These and other objects of the present invention will become apparent upon consideration of the following detailed description, when read in conjunction with the drawings.

Figure 1:
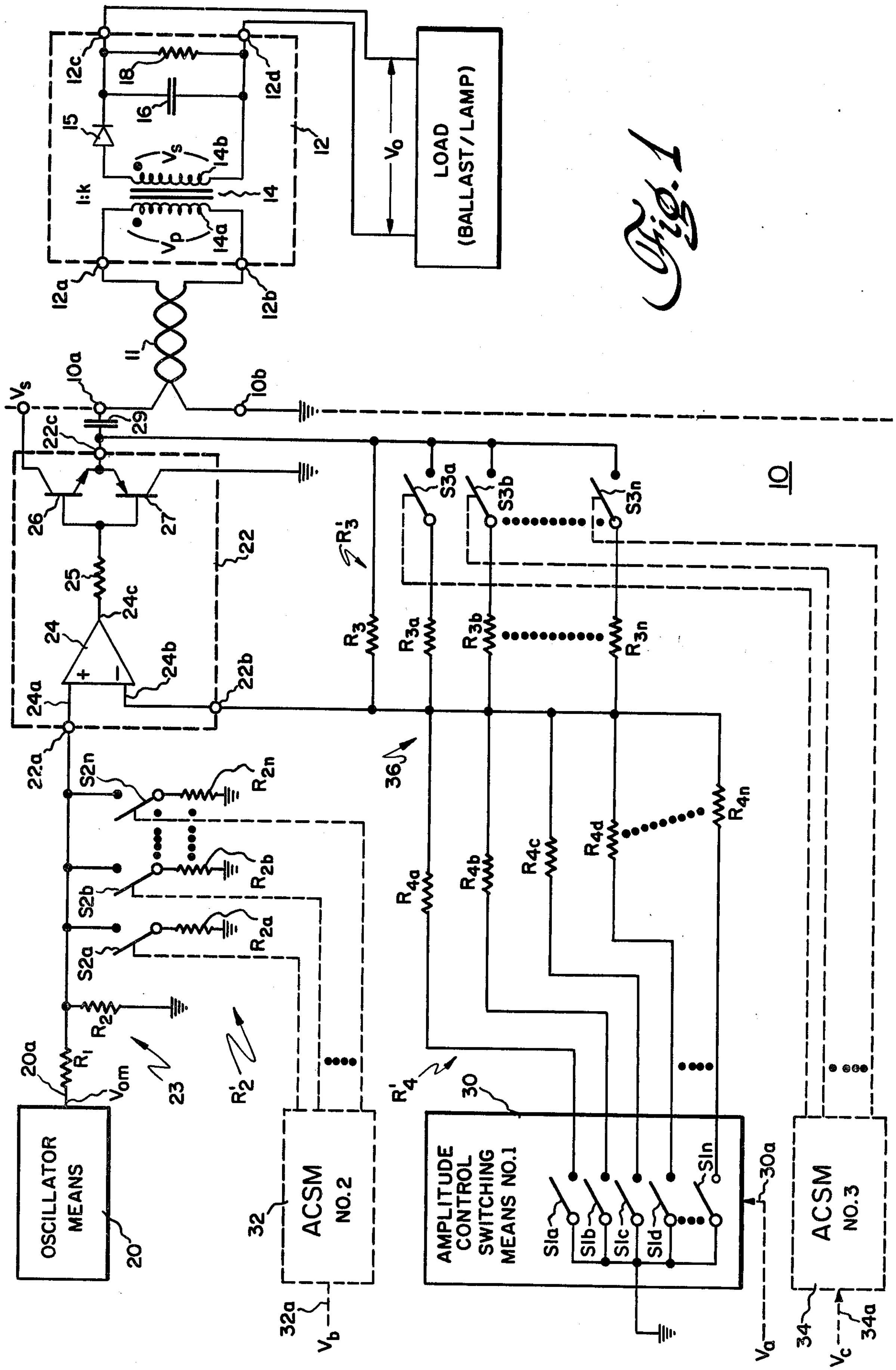
FIG. 1 is a schematic block diagram of a programmable signal amplitude control circuit useful in understanding the principles of the present invention, and of a portion of a system in which such control circuit may be utilized.
Figure 4:
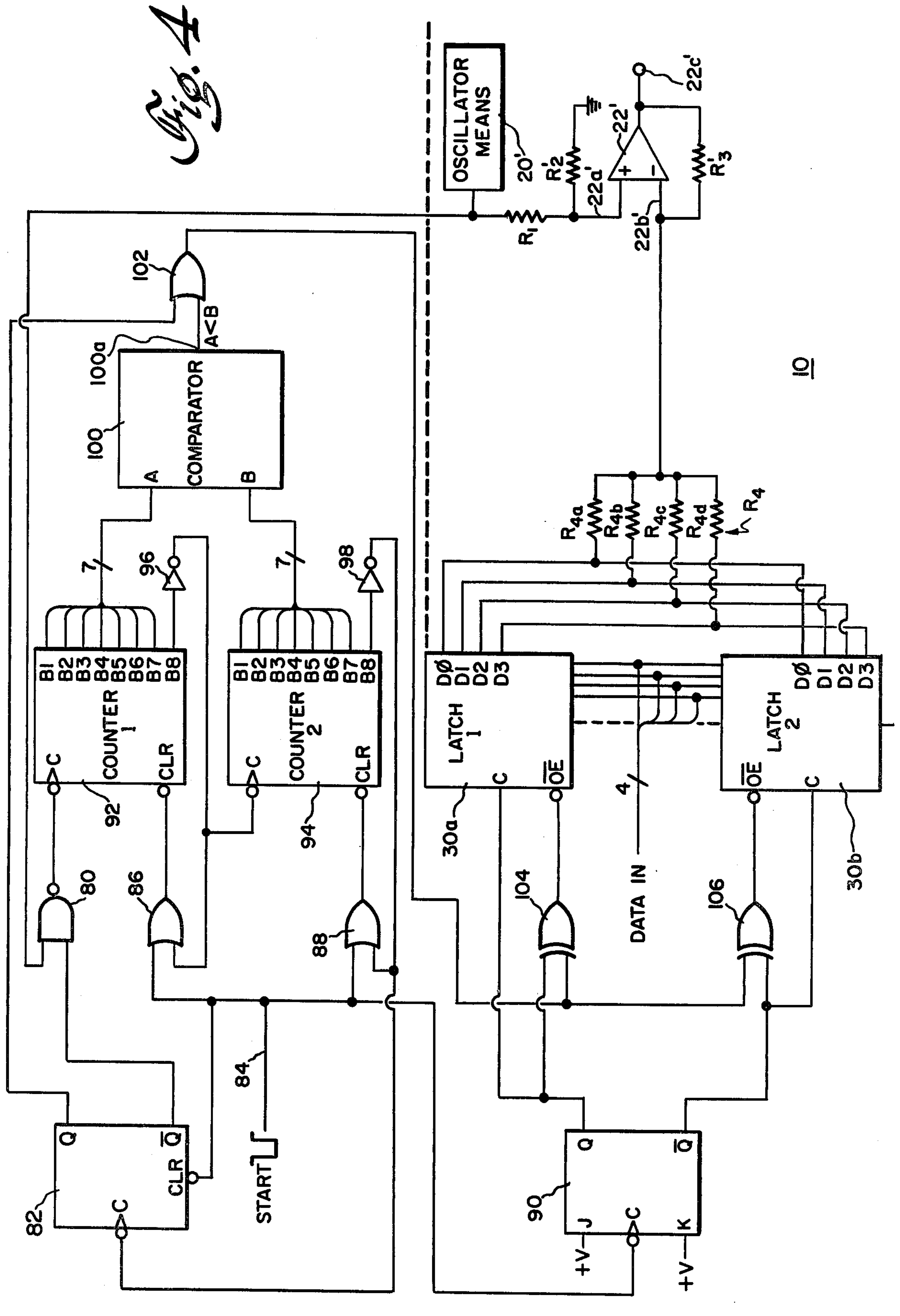

FIGS. *1a* and *1b* are schematic diagrams of control network configurations which may also be utilized in the circuit of FIG. 1;

FIGS. *2a* and *2b* are coordinated graphical illustrations of waveforms occurring in the circuitry of FIG. 1 in one operational mode in accordance with the novel methods of the present invention;

FIGS. *3a* and *3b* are coordinated graphical illustrations of waveforms occurring in the circuit of FIG. 1 in another operational mode in accordance with the novel methods of the present invention;

FIG. *3c* is a graphical illustration, coordinated with the output waveform of FIG. *3b* illustrating the method using modulation of another signal characteristic, i.e. pulse-width;

FIG. 4 is a schematic diagram of a logic subcircuit for use in the programmable signal amplitude control circuit of FIG. 1, to gradually change the output signal amplitude thereof in accordance with the mode of operation of FIGS. *3a* and *3b;*

Figure 5:
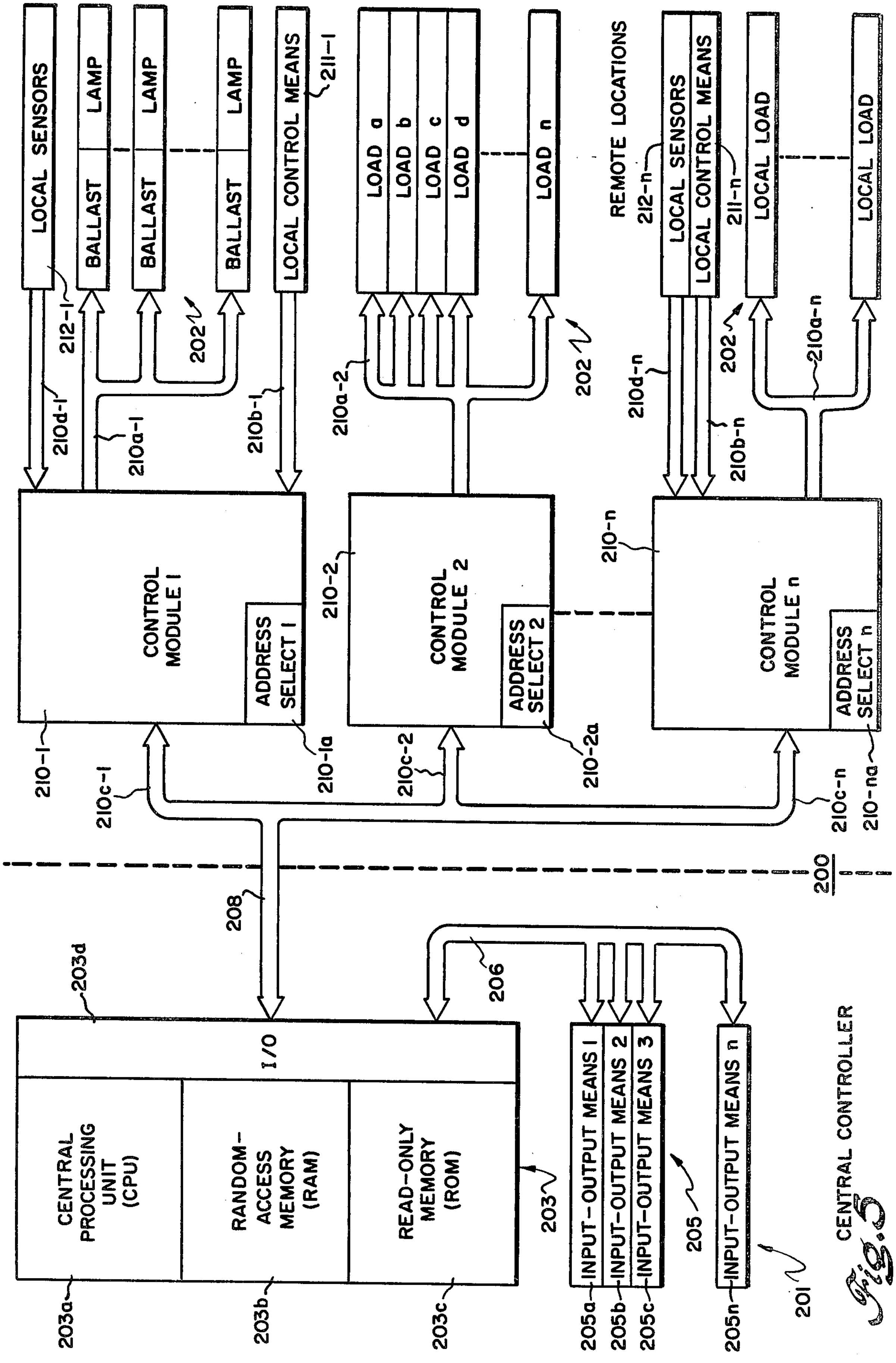

FIG. 5 is a schematic block diagram of an energy management system in which a plurality of loads are individually controlled by each of a plurality of control modules each receiving local and remote-central-location load control information, and useful in understanding application of the methods of the present invention;

FIG. *5a* is a schematic block diagram of a control module receiving both local and remote-central-location load control information for controlling the output condition level of at least one associated load, in the system of FIG. 5;

FIG. *5b* is a schematic diagram of one embodiment of the control module shown in block diagram form in FIG. *5a;*

Figure 5A:
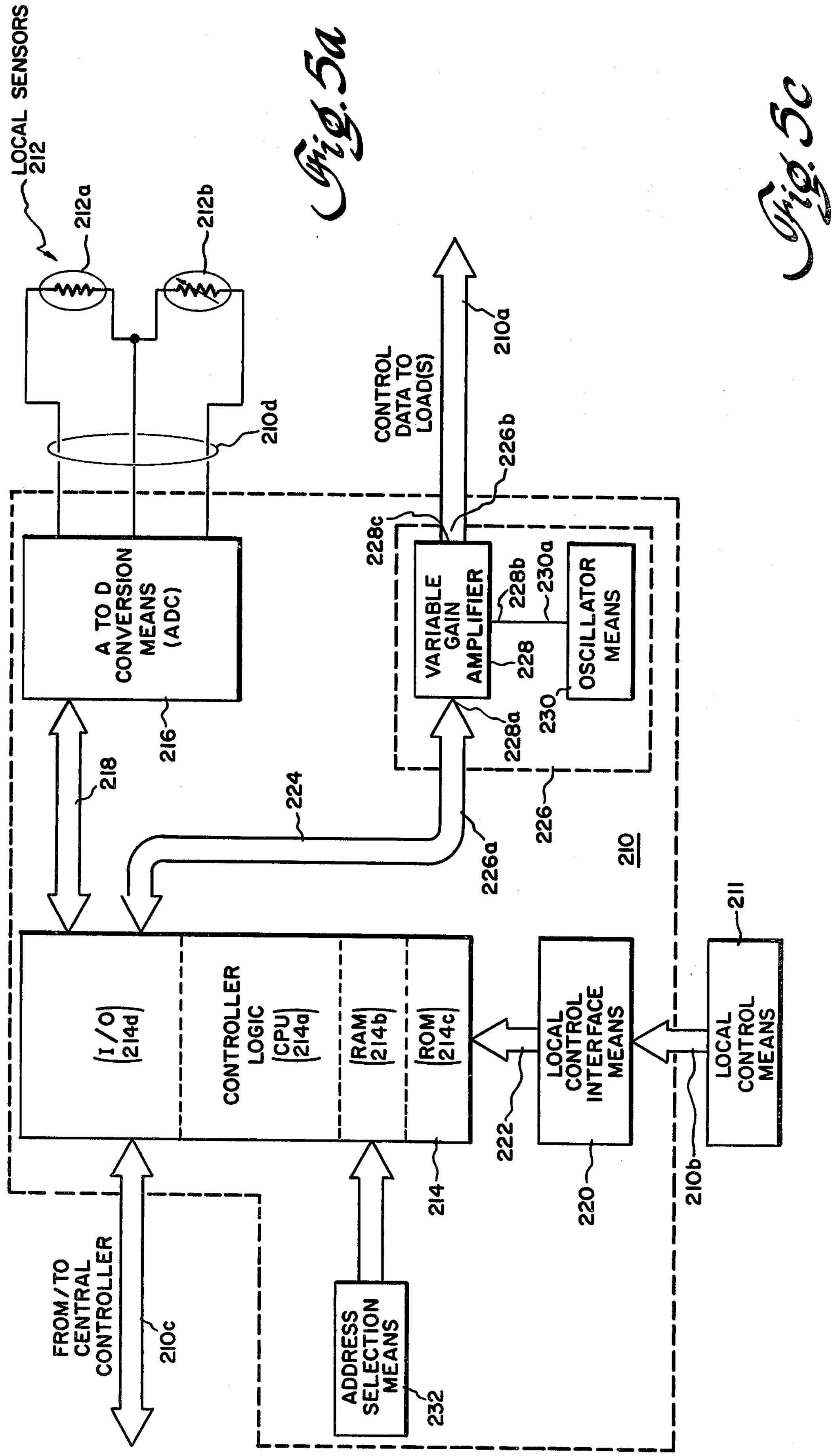
Figure 5C:
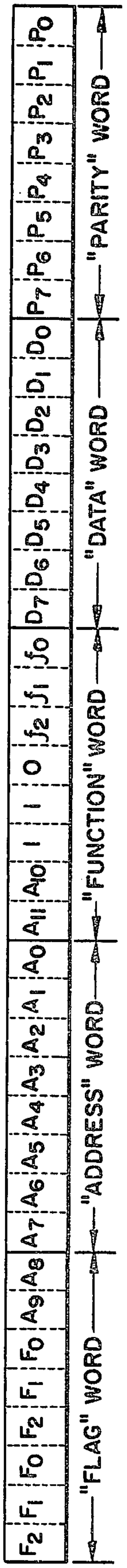
Figure 7:
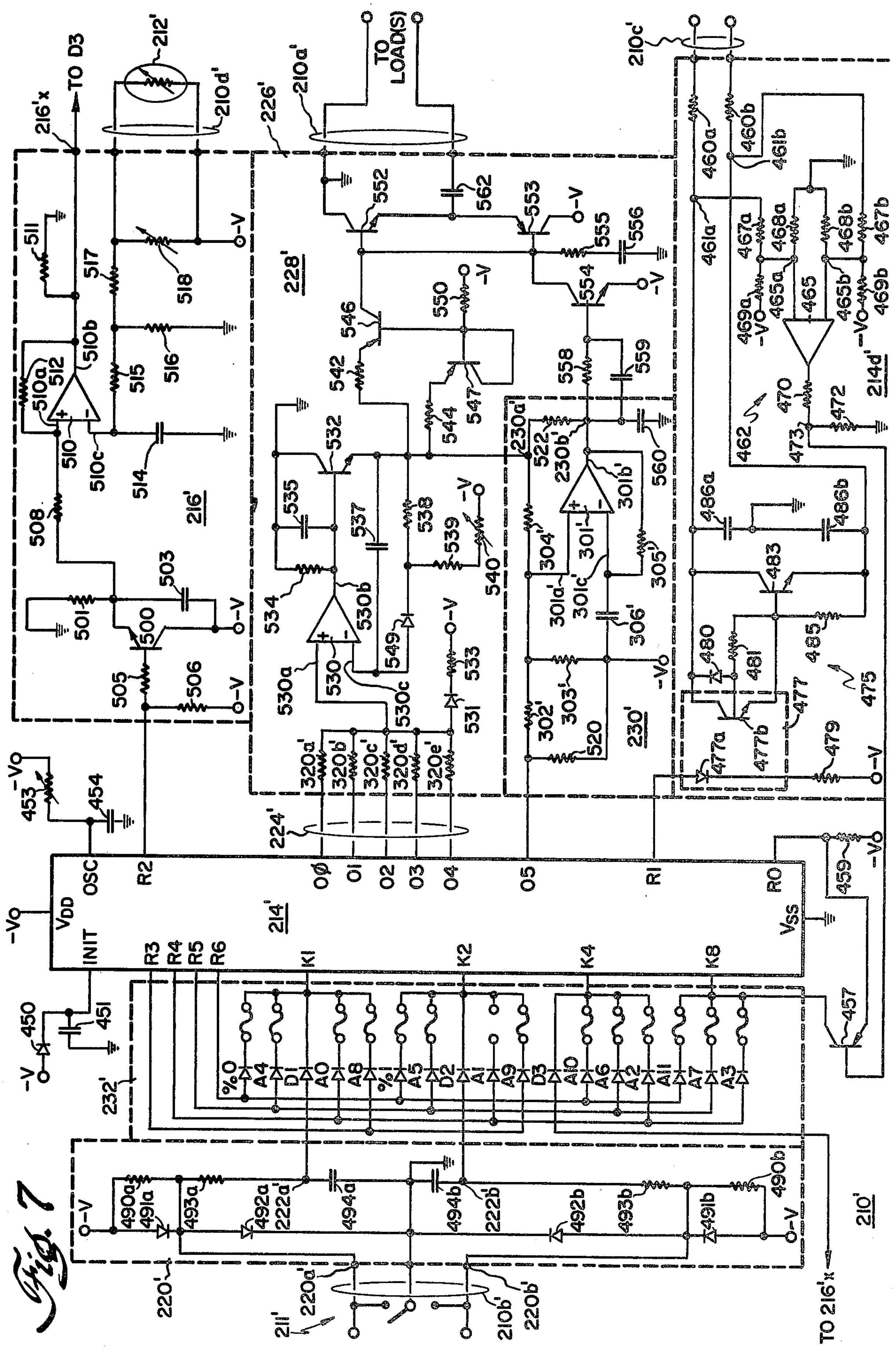

FIG. 5*c* is a diagram illustrating a 40 bit message of five sequential eight-bit words, as may be sent to a control module in the centrally-controlled system embodiment of FIG. 5;

FIGS. 6*a*–6*g* are coordinated flow charts useful in understanding the manner in which the control module circuitry of FIGS. 5–5*c* controls each of a multiplicity of loads using the methods of the present invention;

FIG. 7 is a schematic diagram of another embodiment of the control module shown in block diagram form in FIG. 5*a;*

Figure 7A:
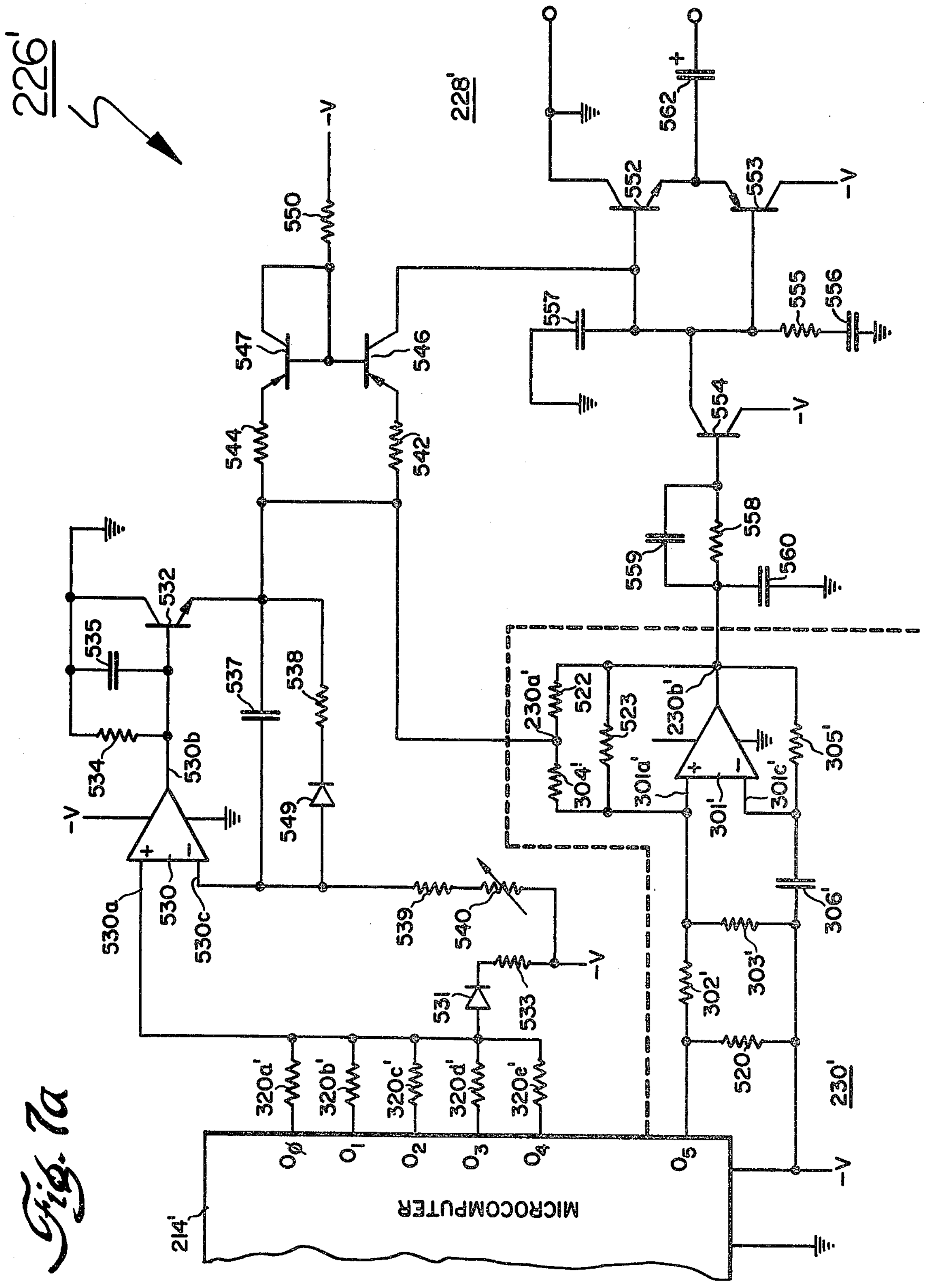

FIG. 7*a* is a schematic diagram of the signal characteristic control circuit of FIG. 7; and FIGS. 8*a*–8*j* are coordinated flow charts useful in understanding the manner in which the control module circuitry, of FIG. 7 controls each of a multiplicity of loads using the methods of the present invention.

DETAILED DESCRIPTION OF THE INVENTION

In order to appreciate the methods of the present invention it is necessary to refer initially to FIG. 1, wherein one example of variable signal characteristic circuitry, in which our novel methods can be practiced, is shown. As more fully described and claimed in co-pending application, Ser. No. 267,274, now U.S. Pat. No. 4,414,501 and incorporated herein by reference in its entirety, a programmable signal amplitude control circuit 10 provides a periodic waveform of adjustable amplitude at an output terminal 10*a* thereof, with respect to a common terminal 10*b* thereof, illustratively at ground potential. The controlled-amplitude periodic-waveform signal may be transmitted via transmission medium 11, such as a twisted wire pair, coaxial cable and the like, to the inputs 12*a* and 12*b* of a load interface circuit 12. Illustratively, load interface circuit 12 is an isolation-and-conversion circuit having an isolation transformer 14 with a primary winding 14*a* across which winding the output signal of control circuit 10 appears with the magnitude $V_p$. A secondary winding 14*b* of the transformer provides the control circuit periodic waveform at a secondary voltage magnitude $V_s$ (which may be greater than, equal to or less than the primary voltage magnitude, in accordance with the primary winding to secondary winding turns ratio 1:k). The secondary winding periodic voltage is converted to a D.C. analog voltage of magnitude $V_0$, between the subsequent circuit output terminals 12*c* and 12*d*, by action of a rectifier diode 15, energy-storage capacitor 16 and load resistance 18. Means 12 may be part of the control circuit or may be a separate circuit, coupled to a subsequent load 19 such as the single D.C. voltage input of a ballast/lamp controller, as more fully described and claimed in co-pending application Ser. No. 242,782, filed Mar. 11, 1981, now U.S. Pat. No. 4,345,200, issued Aug. 17, 1982, assigned to the assignee of the present invention and incorporated herein by reference. In that application, the D.C. analog voltage signal $V_0$ is utilized to set the lighting output level of a variable-output fluorescent lamp/ballast combination in a programmable lighting system.

Programmable signal amplitude control circuit 10 includes an oscillator means 20 for providing a periodic signal at a desired frequency and an essentially constant amplitude Vom at the output 20*a* thereof. The periodic signal is applied to the non-inverting input 22*a* of a power operational amplifier 22, via a first voltage divider 23, including a series resistance $R_1$ and a shunt resistance $R_2$, connected between the operational amplifier non-inverting input and ground potential.

Operational amplifier 22 illustratively is realized by the use of a differential amplifier 24, having its non-inverting input 24*a* connected to the operational amplifier non-inverting input terminal 22*a* and its inverting input 24*b* connected to operational amplifier inverting input terminal 22*b*. The amplifier output 24*c* is connected through a resistance 25 to the base electrodes of a complementary-symmetry pair of output transistors 26 and 27. The collector electrode of the NPN transistor 26 is connected to a source of operating potential magnitude $+V_S$, while the emitter electrode thereof is connected to operational amplifier output terminal 22*c* and the emitter electrode of the PNP transistor 27, having its collector electrode connected to ground potential. As is well-known, this configuration provides an operational amplifier having an increased output current capability.

The operational amplifier output 22*c* is connected via a D.C. isolation capacitance 29 to circuit output terminal 10*a* and is also connected back to operational amplifier inverting input terminal 22*b* via a feedback resistance $R_3$. It will be seen that, with only the voltage divider formed of resistances $R_1$ and $R_2$ connected to the non-inverting input, and with feedback resistance $R_3$ connected between the inverting input and the output 22*c*, the operational amplifier circuit is a voltage follower having a gain of less than one (i.e. a gain given by $R_2/(R_1+R_2)$, and therefore provides an output signal at the same frequency as, but with a lesser amplitude than the signal at oscillator output 20*a*.

A plurality of feedback resistance elements $R_{4a}$–$R_{4n}$ each have one terminal thereof connected to operational amplifier inverting input 22*b* and the remaining terminal thereof connected to one terminal of a like plurality of associated and individually controllable switch means S1*a*–S1*n* of a first amplitude control switching means 30. The remaining terminals of switches S1*a*–S1*n* are connected together to a fixed potential, such as ground potential. A control input 30*a* receives a digital control signal $V_a$, controlling which of switch means S1*a*–S1*n* are to be short-circuited or open-circuited, at any particular time. An equivalent resistance $R_4'$ is thus connected between ground potential and operational amplifier input 22*b*; equivalent resistance $R_4'$ has a resistance magnitude dependent upon the configuration of those switch means S1*a*–S1*n* connecting associated ones of resistance elements $R_{4a}$–$R_{4n}$ to ground potential. The control circuit output signal amplitude $V_p$ is thus given by the formula $$V_p = V_{om}(1+(R_3/R_4'))\times(R_2/R_1+R_2).$$

Thus, if the ratio of resistance $R_1$ to resistance $R_2$ is less than the ratio of $R_3$ to resistance $R_4'$, the amplitude of the periodic waveform at circuit output terminal 10*a* will be greater than the oscillator means output waveform amplitude. Similarly, if equivalent resistance $R_4'$ is much greater than resistance $R_3$, as by open-circuiting all of associated switches S1*a*–S1*n*, the operational amplifier voltage-follower has a gain of one and only the input attenuator 23 (of resistances $R_1$ and $R_2$) acts on the signal amplitude; the circuit output signal is of lesser amplitude than the oscillator means output signal amplitude.

A second plurality of resistance elements $R_{2a}$–$R_{2n}$ each have one terminal connected to a fixed potential, such as ground potential, and the remaining terminal connected to one terminal of an associated one of a like plurality of individually controllable switch means S2*a*–S2*n*. The remaining terminal of each of switches S2*a*–S2*n* are all connected in parallel to operational amplifier non-inverting input 22*a*, whereby each of resistance elements $R_{2a}$–$R_{2n}$ will be in parallel electrical connection with resistance $R_2$ when the associated switch means S2*a*–S2*n* is short-circuited. Switch means S2*a*–S2*b* are part of a second amplitude control switching means 32, and are set to their respective open and closed positions in accordance with the data of a digital control signal $V_b$ at a data input 32*a* thereof. Another plurality of resistance elements $R_{3a}$–$R_{3n}$ each have one terminal thereof connected to one terminal of an associated one of a like plurality of individually controllable additional switch means S3*a*–S3*n*. Each of the series-connected resistance-switch circuits are connected in parallel across resistance $R_3$. Each of the switch means S3*a*–S3*n* forms a part of a third amplitude control switching means 34 and is individually controlled in accordance with the data contained in a third digital information signal $V_c$, at a control input 34*a*, thereof.

Each of digital control signals $V_a$, $V_b$ and $V_c$ may be supplied manually, or by programmable apparatus, such as a microcomputer or the like. Thus, it will be seen that an effective resistance magnitude $R_2'$ (the equivalent resistance between operational amplifier non-inverting input terminal 22*a* and ground potential) can be varied, as can the resistance magnitude of another feedback resistance $R_3'$ (the equivalent resistance between operational amplifier inverting and output terminals 22*b* and 22*c*, respectively), in addition to programmably variable resistance R4′ (between operational amplifier inverting input terminal 22*b* and ground potential). Resistances $R_3'$ and $R_4'$ form a second programmably controllable resistive voltage divider 36 having an input connected to output terminal 22*c* and an output connected to inverting input terminal 22*b*.

The control circuit output voltage $V_p$ is now given by $$V_p = V_{om}(1+(R_3'/R_4'))\times(R_2'/(R_1+R_2')).$$

Variation of the magnitude of resistance $R_2'$ may be utilized, if $R_3'$ and $R_4'$ are of the same order of magnitude, to establish the magnitude of the output signal at a value less than the magnitude of the oscillator output signal, while coordinated variation of the values of resistances $R_3'$ and $R_4'$ may be utilized to establish the value of the output signal at a magnitude greater than, or equal to, the magnitude of the oscillator output signal. Therefore, a wide range of output signal amplitudes can be programmably controlled by the data signals Va, Vb and Vc. Further, one of a range of minimum output amplitudes can be selected by closure of an associated one of switch means S2*a*–S2*n* the size of the output steps then being controlled by either, or both of S3*a*–S3*n* and S1*a*–S1*n*.

Figure 1A:
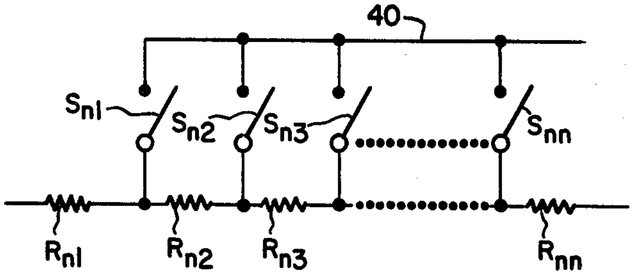
Figure 1B:
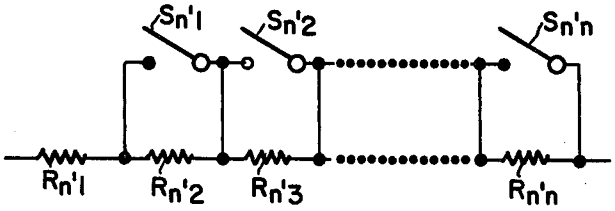

Referring now to FIGS. 1*a* and 1*b*, each of the programmably-controllable and step-wise variable resistances (the paralleled sets represented in FIG. 1 by equivalent resistances $R_2'$, $R_3'$ and $R_4'$) may be equally as well provided by an equivalent resistance $R_n$, comprised of a series string of a plurality of resistances $R_{n1}$–$R_{nn}$, having the junctions therebetween connected to a common line 40 by closure of an associated one of a plurality of switch means $S_{n1}$–$S_{nn}$. Similarly, each of the equivalent resistances may be provided by an equivalent resistance $R_n'$ comprised of a string of series resistances $R_{n'1}$–$R_{n'n}$ having a pair of adjacent junctions therebetween selectively short-circuited by means of an associated one of a plurality of switch means $S_{n'1}$–$S_{n'n}$. It should be understood that many other resistance switching arrangements may be useful, in controlling the magnitude of each of resistances $R_1$, $R_2'$, $R_3'$ and $R_4'$, to programmably adjust the values thereof to provide the oscillator output waveform with a desired control amplitude at the output 10*a* of amplitude control circuit 10. It should also be understood that each switch means may be electromechanical, mechanical or electronic in nature, e.g. the output of a switching transistor or logic gate or the like.

Figure 2A:
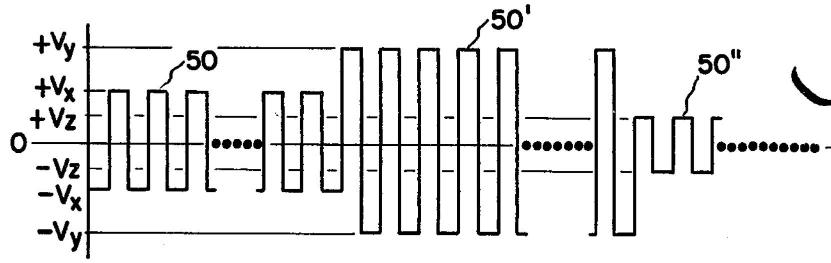
Figure 2B:
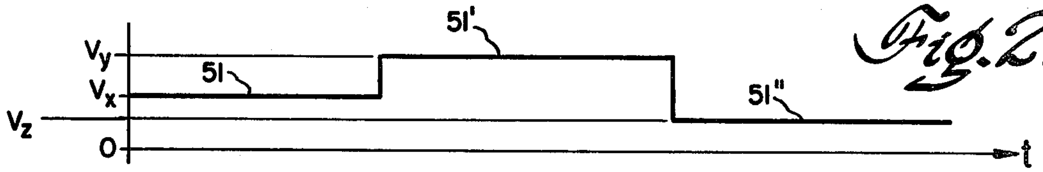

Referring now to FIGS. 2*a* and 2*b*, in accordance with one presently preferred mode of operation of the invention, oscillator means 20 may produce a square waveform, which square waveform is made to appear at circuit output 10*a* as a waveform 50 having a first peak-to-peak amplitude, e.g. alternating between a positive-polarity amplitude of $+V_x$ and a negative-polarity amplitude of $-V_x$. Assuming negligible attenuation of the waveform during transmission through media 11, the control circuit waveform appears across transformer winding 14*a* as the primary voltage $V_p$ thereof, as shown in FIG. 2*a*. Rectification of the secondary winding periodic waveform provides a first output voltage waveform 51, of FIG. 2*b*, which is a D.C. analog level of associated magnitude $+V_X$ (which may control the subsequent load, e.g. a dimmable fluorescent lamp, to a first output level). By modification of the digital signals $V_a$, $V_b$ and/or $V_c$, the closure of the appropriate ones of switch means S1*a*–S1*n*, S2*a*–S2*n* and S3*a*–S3*n* may be effected to change, e.g. increase, the magnitude of the control circuit output waveform, to provide a primary winding voltage $V_p$ waveform 50′ alternating between a positive-polarity magnitude $+V_y$ and a negative-polarity magnitude $-V_y$, where $|V_y|$ is different from, e.g. greater than, $|V_x|$. Responsive to the increased absolute amplitude of the control circuit output waveform, the rectified waveform 51′ is a D.C. analog voltage of level proportional to $V_Y$, with $V_Y$ being different from, e.g. greater than, $V_X$ (which may control the subsequent load to another output level different from the output level to which the subsequent load was controlled by the D.C. analog voltage output magnitude $V_x$).

Subsequently, new digital command signals may be given to again vary the programmed output voltage of control circuit 10 to reduce, rather than increase, the magnitude of output waveform 50″ to peak values of $+V_z$ and $-V_z$. Accordingly, the rectified voltage $V_0$ D.C. analog voltage level 51″ decreases to a value proportional to $+V_Z$, which may control the subsequent load to an output level different from the output levels set by either of the output level magnitudes $V_X$ or $V_Y$.

It will be seen that a multiplicity of control circuit output waveform magnitudes (and a similar multiplicity of associated D.C. analog voltage $V_0$ levels) may be provided by proper choice of both the number and value of resistances $R_{2a}$–$R_{2n}$, $R_{3a}$–$R_{3n}$ and $R_{4a}$–$R_{4n}$, for any given value of resistance $R_1$. Particular utility may be found in the use of binary scaling of the resistances forming any of the sets of the plurality of resistors making up equivalent resistances $R_2'$, $R_3'$ and/or $R_4'$. It should also be understood that the values of fixed resistors $R_1$, $R_2$ and $R_3$ may be selected to achieve a predetermined minimum or maximum control circuit output waveform signal level, which may be less than, equal to, or greater than the substantially constant magnitude of the oscillator waveform, as desired for a particular end use. This is especially important where the amplitude control switching means 30, 32 and/or 34 are directly interfaced to programming apparatus, such as a microcomputer and the like; if the programming apparatus fails, for any reason whatsoever, to issue amplitude control signals $V_a$, $V_b$ and $V_c$ to control circuit 10, the predetermined minimum or maximum output waveform amplitude will be maintained (which may be utilized, for example, to establish a minimum or maximum load output level in the event of programming apparatus failure). Further, it should be understood that some of the amplitude control switching means 30, 32 and 34 may be deleted and the associated switch means may be replaced with manually activatable switches, whereby minimum and/or maximum circuit output waveform magnitudes may be field selectable, with the remaining amplitude control switching means being utilized in programmable fashion to select output signal magnitudes in the range set by the manually-selected minimum and/or maximum magnitudes.

It will be seen, however, that the transition between levels, such as the transition from output level 51 to a greater level 51′, or from level 51′ to a lesser level 51″, is a substantially rapid transition. Particularly, where the light output level of an electronically-controlled ballast/lamp combination is provided responsive to the output magnitude of the control circuit waveform, as set by the data output of the microcomputer, it is advantageous that a relatively small number, e.g. 16, of discrete levels of control amplitude waveform be used. However, it is often annoying, to persons in an area controlled by such a programmable lighting system, to have the lighting level rapidly shift from one level to the next, as the computer carries out a lighting level adjustment. Accordingly, it is desirable to operate control circuit 10 in such a manner as to make the change between different levels occur at a sufficiently slow rate that the load output level change is not readily noticeable. While such a slow transition may be effected by increasing the value of energy-storage capacitor 16, the use of a large capacitor is not only undesirable from a cost standpoint, but also substantially reduces the ability to effect a desired rapid change in output level, as when the load is to be turned immediately on to full output level or immediately off to zero output level.

Figure 3A:
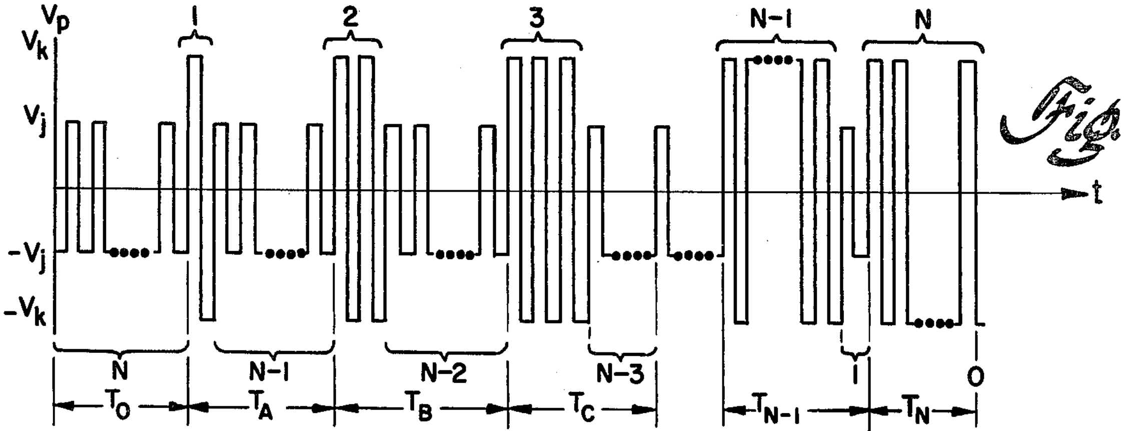
Figure 3B:
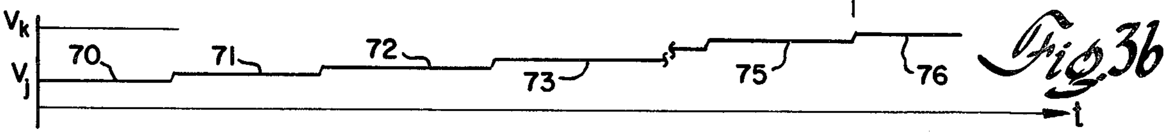

Referring to FIGS. 3*a* and 3*b*, programmable signal amplitude control circuit 10 may be operated to change the output signal magnitude in programmable manner while at the same time eliminating sudden transitions in the magnitude of the D.C. analog level recovered therefrom. In this presently preferred method of operation, the amplitude of the control circuit waveform is varied, between the level presently utilized (the initial level) and the next-commanded (final) level, at a rate that is greater than the time constant, set by the value of filter capacitance 16 and load resistance 18, of the circuit (e.g., isolation-and-conversion circuit 12) which is a load thereon. If the oscillator waveform frequency is substantially greater than the inverse of that time constant, a gradual change in the time duration during which each of the final and initial levels are present in a fixed time interval T, will gradually change the load circuit output voltage $V_0$ in a smooth manner.

More particularly, assume that the oscillator frequency is about two orders of magnitude greater than the inverse of the load time constant; the number of waveform cycles at each level is controlled on a cycle-by-cycle basis and is gradually changed, from an initial interval $T_A$ of N cycles at the initial level, through N-1 intervals of N-M (where M changes sequentially from 1 to N-1) initial cycles at the final level and then M cycles at the initial level, to a final time interval with all N cycles at the final level. Thereafter, the amplitude is no longer controlled on a cycle-by-cycle basis, but the control circuit output waveform remains at the final level. Thus, for example, prior to the start of a zero-th time interval $T_o$, the microcomputer (not shown) has been commanded to gradually change the output analog voltage from a first level $V_j$ to a second level $V_k$. The digital control signals $V_a$, $V_b$ and $V_c$ had previously been set to those values necessary to provide an initial $V_J$ level D.C. analog output level, whereby the control circuit output-transformer primary winding voltage $V_p$ waveform alternates between levels of $+V_j$ and $-V_j$. During this time interval, which may contain N oscillator waveform cycles, the digital commands given to the various amplitude control switching means 30, 32 and/or 34 continue to set the output waveform amplitude at initial level $\pm V_j$. During the next-subsequent (first) time interval $T_A$, the amplitude control switching means digital input signals $V_a$, $V_b$ and $V_c$ are modified by the microcomputer to cause the first oscillator waveform cycle in that time interval to be transmitted with peak amplitudes of $+V_k$ and $-V_k$, for providing the final output level $V_K$. The remaining N-1, e.g. 499, cycles (for an illustrated system having N=500 oscillator waveform cycles in each time interval) during the first time interval $T_A$ are each transmitted at the previous (initial) level, by causing digital control signals $V_a$, $V_b$ and $V_c$ to revert to the appropriate values for the initial signal amplitude. In the next (second) time interval $T_B$, the first two oscillator waveform cycles are transmitted with the amplitude assigned to the final output value and the remaining (N-2) of the N cycles in this interval are transmitted at the initial amplitude. Similarly, during an immediately-following time interval $T_C$, the first three cycles are transmitted with the final-value amplitude and the remainder (N-3) of the N cycles are transmitted with the initial amplitude. The number of initial waveform cycles, transmitted with the final-value amplitude, in each interval is increased by 1 and the number of cycles in the remainder of each time interval, transmitted with the initial-value amplitude, is decreased by 1, in each subsequent time interval. Thus, in the next-to-last time interval $T_{N-1}$, the first N-1 cycles are transmitted with the final-value amplitude and the last cycle is transmitted with the initial amplitude; in the final time interval $T_N$ all N cycles are transmitted with the final-value amplitude. Thereafter, all cycles are transmitted with the final-value amplitude, alternating between levels of $+V_k$ and $-V_k$. Thus, the change occurs over N time intervals, wherein the first M cycles are transmitted at the final-value and the subsequent (N-M) cycles are transmitted at the initial value, with M starting at a value of 1 and being increased by 1 for each subsequent time interval until M equals N.

The recovered D.C. analog voltage $V_0$ will, as shown in FIG. 3*b*, have its initial value $V_J$ during time interval $T_o$. During the next time interval $T_A$, the increased-amplitude first pulse will charge storage element 16 to a greater extent than the somewhat lesser magnitude waveform associated with the initial value; as the discharge time constant associated with storage element 16 is much greater than the time for one cycle control circuit waveform, the additional energy storage element 16 will be added to the energy stored therein during the subsequent N-1 cycles at the initial value, whereby the output level 71 during time interval $T_A$ will be slightly greater than the output level 70 during initial time interval $T_o$. Similarly, the reception of two cycles of the final-value amplitude, at the start of time interval $T_B$, will add even further charge to energy storage element 16 and raise the voltage thereacross slightly, whereby the associated output voltage 72 is slightly greater than the previous level 71. During third time interval $T_C$, the three initial cycles of final-value amplitude will cause the output voltage $V_0$ to again have a level 73 different from (e.g. greater than) the previous level 72.

Eventually, in the next-to-last time interval $T_{N\text{-}1}$, the N-1 cycles of the final-value level waveform provide an output level 75 which is slightly different from (e.g. greater than) the immediately-previous level, and which level almost approaches the final level 76 of magnitude $V_K$, finally provided when all N cycles of the control circuit waveform have their final-value magnitudes in the final time interval $T_N$ of the amplitude-shift procedure. Thus, there is no sudden jump in output level between initial magnitude 70 and final magnitude 76, but only a gradual change in output magnitude therebetween. It should be understood that the final-valued-amplitude waveform cycles need not occur at the commencement of the associated time interval, and that M, the number of final-value-magnitude cycles in a time interval, need not increase only in unit steps in successive time intervals; M may, if desired, increase by a factor K greater than one, with a concommittant decrease in the number N of time intervals by the selected factor K. Thus, each of $N'=N/K$ time intervals may commence with M' cycles (where M' is an integer successively increasing in steps of K units from K to N) of final-value peak magnitude and be followed by (N-M') cycles of initial-value peak magnitude. For example, if $N=300$ and $K=2$, a total of $N'=150$ time intervals (of $N=300$ cycles each) are used, with the initial interval having $K=2$ cycles of final-value magnitude and $(N-K)=298$ cycles of initial value magnitude. The next interval starts with $2K=4$ cycles of final-value magnitude, followed by $(N-2K)=296$ cycles of initial-value magnitude; a third interval starts with $3K=6$ cycles of final-value magnitude, followed by 294 cycles of initial-value magnitude, etc. It should also be understood that turning the load from a first magnitude level to a selected second level (such as may be used for "immediate-on", "immediate-off" or "immediate-output-level-change" operations) may be accomplished by setting the number N of intervals to zero, whereby the circuit output waveform magnitude changes from continuous cycles at the initial level to subsequent continuous cycles at the new level.

Figure 3C:
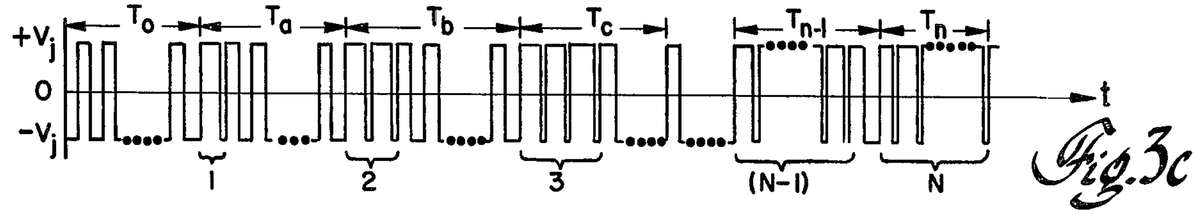

Referring now to FIGS. **3*b* and 3*c*, the recovered D.C. analog voltage $V_0$, as shown in FIG. 2*b*, can also be provided by varying signal characteristics other than the amplitude. In particular, use of a duty-cycle-modulated, or pulse-width modulated signal as shown in FIG. 3*c*. This waveform has a substantially constant amplitude of $V_j$ volts peak. During first time interval $T_0$, all N waveform cycles are sent as a square wave, with 50 percent duty cycle. Thereafter, successively increasing numbers of initial cycles during each time interval T are transmitted with a non-symmetrical shape and therefore with a duty cycle greater than 50 percent. Thus, an initial first cycle 1' is transmitted in time interval $T_A$, with the positive half-cycle thereof modulated to provide a greater-than-50 percent duty cycle; the remaining N-1 oscillator cycles are transmitted as substantially square waveforms. Similarly, in time interval $T_B$, the first two oscillator cycles 2' are transmitted a pulse-modulated waveforms having a greater-than-50 percent duty cycle, with the remaining N-2 cycles being transmitted with the square waveform of the initial value. In subsequent time intervals $T_c \ldots T_{N\text{-}1}$, increasing numbers of initial cycles, e.g. 3, . . . , N-1, are sent with the pulse-modulated, greater-than-50 percent duty cycle and the remaining numbers of cycles, e.g. N-3 . . . , 1, are sent with the substantially square waveform. Finally, in the last time interval $T_N$, all of the N' cycles are sent with a duty-cycle other than 50 percent. We will be seeing that, upon rectification in load interface circuit 12, the output waveform of FIG. 3*b*** will result. It will be understood that each output level corresponds to a different duty-cycle of the pulse-modulated, substantially-constant-amplitude waveform and in a typical use, the initial waveforms, in period $T_0$, may have a first duty-factor, with the initial waveform cycles in the intermediate time intervals $T_a$-($T_m$-1) and all waveform cycles in the final time interval $T_n$ and thereafter, having some other duty-factor. It will be seen that neither the initial-value duty-factor nor the final-value duty-factor need be the 50 percent duty-factor of a substantially square waveform.

Referring now to FIG. 4, a discrete (or "hard-wired") logic subcircuit 10' is illustrated as part of apparatus 10 for providing the gradual output signal level change illustrated in FIGS. **3*a* and 3*b*, in systems wherein a microcomputer or the like is not available to provide the registers, counters, and other programmable entities necessary for controlling the number of oscillator means output waveform cycles during which each of the present and new output amplitudes are to be made available at the apparatus output, with intervals during each of which the plurality of cycles of final and initial type necessary to effect a gradual change, is provided. Control subcircuit 10' includes a 2-input NAND gate 80 having a first input thereof receiving the substantially constant output amplitude and frequency waveform from oscillator means 20'. The remaining input of gate 80 is connected to the $\overline{Q}$ output of a first flip-flop logic element 82. A START input line 84 is connected to the clear CLR input of flip-flop 82 and also to one input of each of a pair of two-input OR gates 86 and 88, and to the clock C input of a J K type flip-flop 90. Both the K and J inputs of flip-flop 90 are connected to a positive logic operating potential +V such that flip-flop 90 operates as a toggled flip-flop, changing the state of the binary level at its Q and $\overline{Q}$ outputs in alternating manner responsive to each logic zero level presented at the clock C input thereof. The output of NAND gate 80 and the output of OR gate 86 are respectively connected to a clock C input and a clear CLR input of a first counter 92. A second counter 94 has the clock input thereof connected to the remaining input of OR gate 86, and to the output of an inverter 96. The output of another inverter 98 is connected to the remaining input of OR gate 88 and also to the clock C input of first flip-flop 82. First counter 92 is utilized to count the number of oscillator waveform pulses transmitted at the present, or "old", amplitude level, while second counter 94 is utilized to count the number of oscillator waveform pulses transmitted at the "new" level. Illustratively, counters 92 and 94 are eight-bit binary counters, having the first seven sequential binary counter stages thereof respectively bussed to the respective A and B inputs of a seven-bit digital comparator 100. The eight bit output of counters 92 and 94 are respectively connected to the input of respective inverters 96 and 98. The comparator "A-less-than-B" output 100***a* is connected to one input of a two-input OR gate 102, having its remaining input connected to the Q outputs of flip-flop 82. The output of gate 102 is connected in parallel to one input of each of a pair of exclusive-OR gates 104 and 106. The remaining input of gate 104 is connected to the Q output of flip-flop 90, while the remaining input of gate 106 is connected to the $\overline{Q}$ output of flip-flop 90. A single amplitude-control-switching means 30 (of FIG. 1) is provided by a pair of data latches 30*a* and 30*b*, each having a clock C input respectively connected to the Q and $\overline{Q}$ outputs of flip-flop 90.

Latches 30*a* and 30*b* are of the type which store input data responsive to the rising edge of the waveform at the clock C input thereof, but do not provide the stored data at the data outputs DØ–D3 thereof until a logic zero level is provided at an output enable $\overline{OE}$ input of the individual latch circuit. The output enable $\overline{OE}$ inputs of latches 30*a* and 30*b* are respectively connected to the output of exclusive-OR gate 104 or 106, respectively.

Illustratively, the output signal amplitude is controlled by means of varying the value of feedback voltage-divider resistance $R_4$ (comprised of resistances $R_{4a}$, $R_{4b}$, $R_{4c}$ and $R_{4d}$) therefore, latches 30*a* and 30*b* are each four-bit data latches having their respective four bit inputs connected to a four-bit-wide DATA IN bus and having like-numbered outputs DØ–D3 connected in parallel and to the associated one of resistances $R_{4a}$–$R_{4d}$, at the terminal thereof furthest from operational amplifier input 22*b*'. Thus, the first and second data latch DØ outputs are connected together in parallel to the terminal of resistance $R_{4a}$ furthest from the operational amplifier; similar parallel connection is effected for the D1, D2 and D3 outputs with respect to associated resistances $R_{4b}$, $R_{4c}$ and $R_{4d}$.

In operation, assume that the second flip-flop 90 Q and $\overline{Q}$ outputs are respectively at the logic one and logic zero levels and that first latch 30*a* has "present" level data available at the DØ–D3 outputs thereof. Therefore, individual ones of the first latch data outputs are either at a logic-zero "ground" level or at a logic-one "open" level and set the gain of amplifier 22' accordingly. The magnitude of the signal at amplifier output 22*c*' is established by this gain, as the amplitude of the signal from oscillator 20' is substantially constant. The load receives the "present level" operational amplifier output waveform, and the load output level is accordingly set.

Four bits of data for a "new" level are provided on the DATA IN bus, but are not necessarily clocked into either latch by the mere appearance of these data bits thereon. When a gradual level transition is to commence, a logic-zero pulse is provided on START line 84, which is normally at the logic one level. The START pulse clears first flip-flop 82, such that the Q and $\overline{Q}$ outputs thereof are respectively logic-zero and logic-one levels. The START pulse is transmitted through each of OR gates 86 and 88 and resets the first and second counters 92 and 94 respectively, to a zero count, i.e., all of output bits B1–B8 go to the logic-zero level. The START pulse also toggles second flip-flop 90, such that the Q and $\overline{Q}$ output levels are now reversed. The appearance of a logic-one level at the $\overline{Q}$ output of flip-flop 90 provides the necessary rising edge of the clock C input of second latch 30*b*, causing the four bits of new level data to be clocked into second latch 30*b*. Thus, first latch 30*a* stores the four bits of present level data and second latch 30*b* stores the four bits of new level data.

The presence of a logic-one at the $\overline{Q}$ output of first flip-flop 82 enables transmission of the oscillator waveform through gate 80 to the clock C input of first counter 92. Counter 92 begins incrementing its internal count, which count is provided by the seven bit-wide output bus to the comparator A input. As second counter 94 has been reset and is yet to be incremented, the seven-bits of data at the comparator B input remains at a digital zero representation, where A is not less than B and comparator output 100*a* will be at a logic-zero level. As both inputs of gate 102 are logic-zero levels, the output of that gate provides a logic-zero level to both gates 104 and 106. The output of gate 106 is in a logic-one condition, which does not enable the second latch data output. The output of gate 104 is in a logic-zero condition, enabling the output of the first latch, whereby the present level data is provided to resistance $R_{4'}$, providing a "present" level amplitude waveform at amplifier output 22*c*'. This condition obtains is maintained while first counter 92 counts the first 127 cycles of the oscillator means 20' output waveform. On the 128th cycle, first counter 92 outputs B1–B7 return to the logic-zero level, while the B8 output goes to a logic-one level. Inverter 96 now provides a logic-zero level to the clock C input of second counter 94, incrementing the count (previously zero) therein. Simultaneously therewith, the inverter output logic-zero level is applied through gate 86 to the CLR input of first counter 92 and clears the logic one level at the B8 output thereof, readying first counter 92 for the second counting cycle (of 128 such cycles during which the slow interval change occurs).

On this 128th, oscillator means output waveform cycle, the count at first counter outputs B1–B7 is a digital zero, while the count at the second counter outputs B1–B7 is a digital one. Therefore, during the 128th, cycle, comparator input A contains a lower digital number than the digital number at comparator input B. The comparator output is enabled to a logic one level, enabling the gate 106 output to a logic zero level and the gate 104 output to a logic one level. Accordingly, the output enable of "present" level latch 1 is disabled and the output of "new" latch 2 is enabled, whereby the amplifier output 22*c*' waveform amplitude changes, for one oscillator waveform cycle, to the new output level amplitude. On the 129th cycle, first counter 92 is incremented and the outputs thereof represent a digital one, equal to the digital one representation at the outputs of second counter 94. The comparator output falls to a logic zero level, as digital count A is no longer less than digital count B. The logic zero level at the output of gate 102 appears at gates 104 and 106, respectively providing logic zero and logic one levels at the output-enable input of latches 1 and 2, respectively. The latch 2 data outputs are disabled and latch 1 data outputs are enabled, to cause the amplifier output 22*c*' waveform amplitude to change back to the amplitude associated with the "present", or "old", level. Therefore, during the first complete cycle of incrementing of first counter 92, only the old data stored in first latch 30*a* was transmitted for 127 cycles, while during the second incrementing cycle of first counter 92, one oscillator waveform cycle of new data was sent followed by 126 oscillator waveform cycles of "old" level data. Thereafter, when first counter 92 is sufficiently incremented such that the B8 output thereof again attains the logic one level, the counter is reset through gate 86 and second counter 94 is again incremented, whereby a digital two representation appears at the comparator B input. During the first two subsequent oscillator waveform cycles, the comparator A digital number is less than the comparator B input number, whereby the output of latch 2 is enabled, sending two cycles of "new" waveform amplitude to the load, and thereafter, the comparator output is disabled, and 126 oscillator waveform cycles of "old" latch level data is provided, as latch 1 is now enabled. It will thus be seen that in each interval having 128 ($=2^7$) cycles of the oscillator means waveform, an increasing number of initial waveform cycles are sent with the "new" level data and a decreasing number of subsequent cycles are sent with the "present" data, with the total number of "new" and "present" oscillator waveform cycles in each interval being sent being equal to the count required for first counter 92 to energize that bit output (e.g. output B8) connected to inverter 96, e.g. 128 cycles.

When all of the outputs B1–B7 of second counter 94 are at a logic one condition, the comparator output is at a logic one level for 127 oscillator waveform cycles and the "new" level waveform amplitude is available at output at 22*c*'. Upon the 128th oscillator waveform cycle, first counter 92 is incremented and the B8 output thereof attains the logic one level; first counter 92 is cleared through gate 86, while second counter 94 is again incremented. The B8 output of second counter 94 is new at a logic one level. Inverter 98 provides a logic zero level to the clock input of flip-flop 82, removing the logic one level at the $\overline{Q}$ output thereof and preventing transmission of further oscillator waveform cycles through gate 80 to first counter 92. Simultaneously therewith, the Q output of flip-flop 82 attains a logic one level, which level is transmitted through gate 102, to gates 104 and 106. The output of gate 106 is held at a logic zero level, enabling the data outputs of second latch 30*b*, continuously providing "new" level data to resistors $R_4$, to cause the amplitude of the waveform at output 22*c*' to remain at the "new" level amplitude.

It will be seen that, should another output amplitude change be required, new data therefor is presented on the four DATA IN bit lines and will only be clocked into one of the latches 30 upon receipt of another logic-zero $\overline{\text{START}}$ pulse. This next START pulse will toggle the Q and $\overline{Q}$ outputs of flip-flop 90 and cause the second set of "new" data to be stored in first latch 30*a*, whereby first and second latches 30*a* and 30*b* now reverse their storage of "old" and "new" level data, e.g. second latch 30*b* now stores the "old" level data and first latch 30*a* now stores the "new" data. This role reversal will occur whenever new level data is caused to be stored in one of latches 30*a* and 30*b* responsive to a logic zero START pulse.

The methods of the present invention find particularly advantageous use in an energy management system 200, as shown in FIG. 5. To fully appreciate the usefulness of these methods in such a system, the system apparatus will be described herein, although the system is more completely described and claimed in co-pending application Ser. No. 267,328, now U.S. Pat. No. 4,425,628, assigned to the assignee hereof and incorporated in its entirety herein by reference. Energy management system 200 includes a central controller 201 for controlling a plurality of loads 202 generally at locations remote from the central controller. The central controller itself includes a central computer apparatus 203, which may be a microcomputer, minicomputer, main-frame computer and the like, having a central processing unit (CPU) 203*a*, utilized with both random-access memory (RAM) means 203*b*, read-only memory (ROM) means 203*c* and input-output transmission I/O means 203*d*. As is well-known in the art, one or more input-output means 205, such as printers, graphic display units, and the like, are connected to the central controller computing apparatus via a bus 206. Thus, n input-output means 205*a*–205*n* can be connected to provide data and instructions to, or receive information from, computer 203. Computing apparatus 203 is also connected, at the I/O means 203*d*, via a bidirectional bus 208, to at least one, and generally several, remote locations at which the various loads are located. Bus 208 may be any known data bus means, including coaxial cable, twisted wire pair, optical fiber, radio communications link or the like.

At each of the remote locations, a control module 210 is connected to at least one load by means of a control data bus 210*a*. Illustratively, each of the loads may be a ballast and fluorescent lamp combination of the type disclosed and claimed in applications filed Aug. 14, 1980 Ser. No. 177,835 now abandoned and 177,942, now U.S. Pat. No. 4,346,332, and incorporated herein by reference in their entireties. Each control module 210 receives load control data both from a local control means 211, via a local control means data bus 210*b*, and from the central facility via a central controller data bus 210*c* which is an extension of the central facility I/O bus 208. The control module may also receive data from local sensors 212 via another data bus 210*d*. Each control module has a portion thereof specifying an address for the control module, whereby individual ones of a plurality of modules can be individually addressed and the load(s) attached thereto can be controlled from the central facility. Thus, a first control module 210-1 includes its own address select portion 210-1*a*, and has a control data output bus 210*a*-1 connected to a plurality of associated loads, e.g. ballast-lamp combinations. The first control module has connected thereto an associated local control means 211-1 and associated local sensors 212-1, for providing local information from the associated remote location, and also has a central facility data bus extension 210*c*-1 connected thereto. Similarly, a second control module 210-2 has its own address select portion 210-2*a*, in which is set an address different from the address set in the address select portion 210-1*a* of the first control module. Control module 210-2 communicates with associated loads via control data bus 210*a*-2, responsive to central facility information provided on central controller data bus 210*c*-2. The illustrated second control module 210-2 is not connected to local control or local sensor means, and is illustratively configured only for remote control from the central location. Other control modules and other remote locations may be centrally and locally controlled, or only centrally controlled, as required in a system configured for a particular usage.

Referring now to FIG. 5*a*, control module 210 provides load output, or energy-consumption, control information to at least one associated load (not shown in this Figure) by means of at least one output data bus 210*a*. In this illustrative embodiment, the load is an input control-ballast-lamp combination, such as formed by a combination of the apparatus described and claimed in the aforementioned incorporated patent applications Ser. Nos. 177,942 and 242,782. Control module 210 may receive control information from either a local control means 211, via an input data bus 210*b* or from the central controller (of FIG. 5), via the central controller data bus 210*c*, illustratively of the bidirectional type, also allowing information to be transmitted from control module 210 to the remote central controller. Control module 210 receives, via another input data bus 210*d*, analog information from at least one local-ambient-condition sensor means 212, which may include a photocell 212*a* (for sensing local ambient light conditions), a thermister 212*b* (for sensing local ambient temperature conditions) and the like.

Control module 210 includes a controller logic means 214, such as a microcomputer; in one presently preferred embodiment, microcomputer 214 is an INTEL 8748. Control logic means 214 may thus include a central processing unit (CPU) 214*a*, a random-access memory (RAM) portion 214*b*, and a read-only memory (ROM) 214*c* in which is stored a logic program for determining the operation of the control module, responsive to certain commands and/or data received from the central controller, local control means 211 and/or local sensors 212, via respective data buses 210*b*, 210*c* and 210*d*. Controller logic means 214 also includes an input-output (I/O) portion 214*d* providing the bidirectional communications capability to and from the central controller via bus 210*c*, as well as between other portions of control module 210 and the controller.

Control module 210 utilizes an analog-to-digital conversion (ADC) means 216 for converting the analog voltage outputs of local sensors 212 to digital data for communication via internal data bus 218 to controller microcomputer 214. Control module 210 also includes a local control interface means 220 for allowing the local control means data, input to control module 210 via bus 210*b*, to be properly formatted and subsequently introduced, via another control module internal data bus 222, into controller microcomputer 214. As will be explained hereinbelow, controller microcomputer 214 is programmed to obey the load command data from the central controller, local control means and local sensors in a predetermined manner, whereby the controller microcomputer provides digital load control data on a control module internal bus 224, for eventual control of load energy consumption/output. The digital load control data bus 224 is connected to the input 226*a* of a digital-to-analog converter (DAC) means 226, having an output 226*b* at which appears an analog signal of magnitude proportional to the value of the digital data received at the DAC means input 226*a*. DAC means 226, which is substantially similar to circuit 10 of FIG. 1, includes a variable gain amplifier 228 having a first input 228*a*. An oscillator means 230 provides, at an output 230*a* thereof, a periodic waveform of substantially constant amplitude, for coupling to another input 228*b* of the variable gain amplifier. The variable gain amplifier modulates a characteristic of the oscillator output waveform, in accordance with the digital data value then applied to amplifier input 228*a*, to provide a modulated carrier waveform at an amplifier output 228*c*. The modulated carrier waveform is transmitted via control module output bus 210*a* to provide control data to the at least one load connected thereto. In this embodiment of control module 210, the control data is transmitted as a pulse-amplitude-modulated waveform (as explained hereinabove with respect to FIGS. *2a*, *2b*, *3a* and *3b*), wherein the oscillator means provides a square wave at a frequency slightly less than 10 kHz., and the waveform amplitude may vary on a long-term, or on a cycle-by-cycle, basis to transmit load control data.

Control module 210 also includes an address selection means 232, coupled to controller logic means 214 to assign a unique address to a particular one of a plurality of control modules, in a centralized-control energy control system. By assigning a unique address to the address selection means 232 of control module 210, a control module will only respond to those central controller commands and data following receipt of the unique address assigned to that particular control module and will ignore central control commands and data prefaced by all other control module addresses.

Figure 5B:
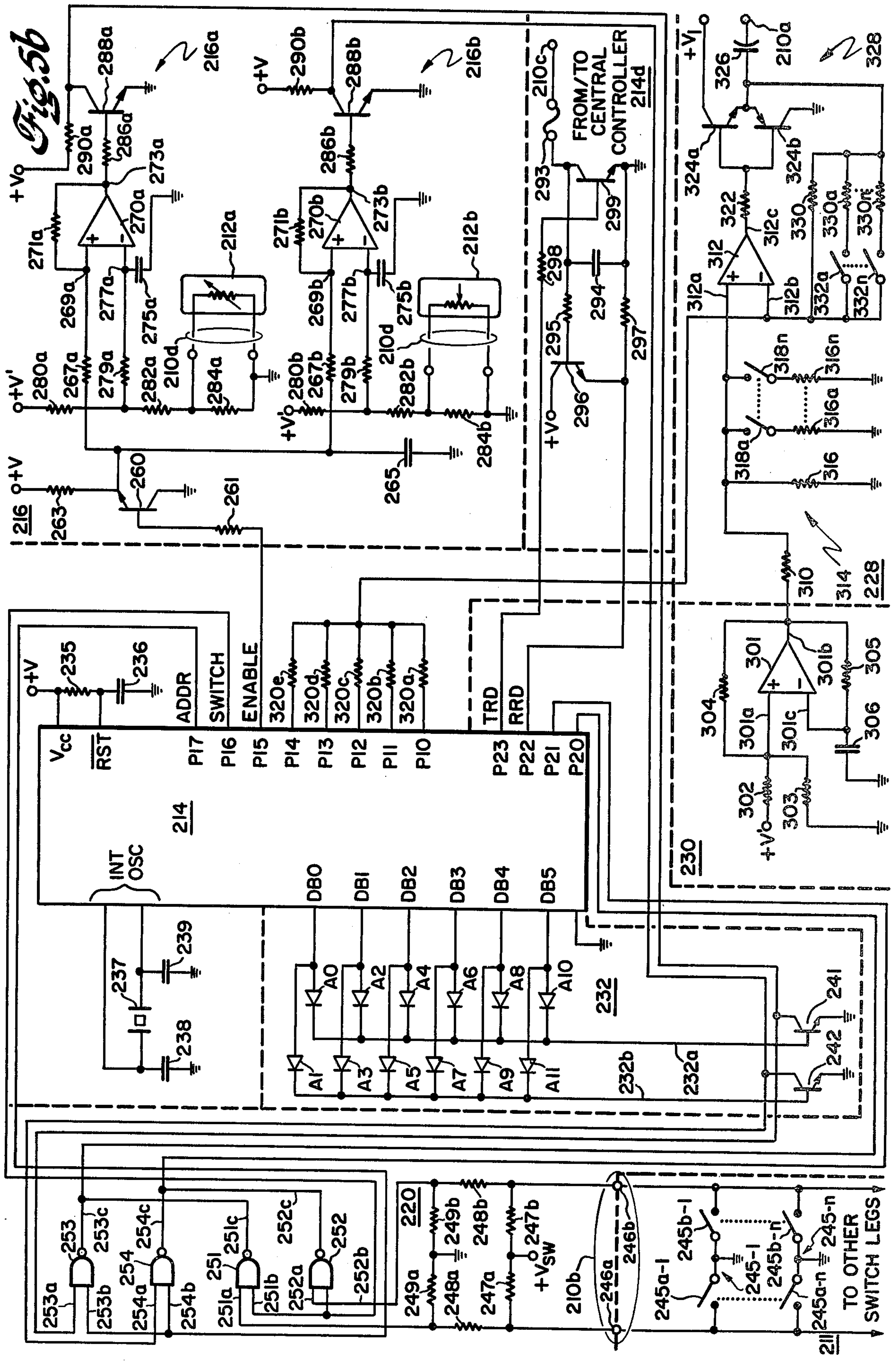

Referring now to FIGS. 5*b* and 5*c*, to provide further background for an understanding of the methods of this invention this embodiment of control module 210 utilizes the aforementioned INTEL 8748 single-chip microcomputer for controller logic means 214. Operating potential is applied to the microcomputer power supply pins and is also applied to a resistance element 235, in series-connection with a capacitance element 236; the junction therebetween is connected to a reset ($\overline{RST}$) input, whereby the controller microcomputer is placed in operating condition upon application of the operating potential thereto. An internal clock signal is provided by a clock crystal element 237, operating in conjunction with a pair of oscillator capacitances 238 and 239.

The microcomputer provides a plurality of data bus outputs, e.g. outputs DB0–DB5, each connected to address selection means 232. The address selection means is comprised of a plurality (e.g. 12) of address selection elements, e.g. diode elements $A_0$–$A_{11}$. Each of data bus outputs DB0–DB5 is connected to the anodes of an associated pair of diodes, e.g. pairs of even-odd numbered elements $A_0$–$A_1$, $A_2$–$A_3$, $A_4$–$A_5$, $A_6$–$A_7$, $A_8$–$A_9$, and $A_{10}$–$A_{11}$ if that particular diode is present. The cathode of one of the pair of diodes (e.g. the even numbered diodes) connected to each data bus output is connected to a first address line 232*a* and the cathode electrode of the remaining diode of each diode pair (e.g. the odd-numbered diode) is connected to a second address line 232*b*. Each of address lines 232*a* and 232*b* is connected to the base electrode of an associated transistor 241 and 242, respectively.

In the illustrated embodiment, local control means 211 comprises a plurality of switch means 245-1 through 245-n, each of which may be a momentary contact, single-pole, double-throw switch unit. Thus each switch unit 245-k (where $1 \leqq k \leqq n$) may be a wall-mounted switch unit of known type and may be considered (as illustrated) as first and second switches 245*a-k* and 245*b-k*, each having one contact thereof connected to ground potential and the remaining contact connected to an associated one of bus terminals 246*a* and 246*b*, respectively. Switches 245*a-k* may be used to control the OFF function, while switches 245*b-k* may be used to CHANGE the output level (by an amount related to the length of time this switch is closed) in a direction set by the UP/DOWN flag. The local control bus 210*b* comprises the pair of switch input terminals 246*a* and 246*b*, each capable of having at least one, and generally several, of the switches 245 connected thereto.

Local control interface means 220 utilizes a source of switchleg operating potential of magnitude $+V_{sw}$, and resistive elements 247*a* and 247*b*, 248*a* and 248*b*, and 249*a* and 249*b*. The junction between resistive elements 248*a* and 249*a*, or between resistive elements 248*b* and 249*b*, is respectively connected to one input 251*a* or 252*a* of one of a pair of two-input NAND logic gates 251 or 252. The remaining logic gate inputs 251*b* and 252*b* are connected together to the P16, or SWITCH, output of controller microcomputer 214. The output 251*c* of NAND gate 251 is tied in parallel to the output 253*c* of another two-input NAND gate 253, while the output 252*c* of NAND gate 252 is tied to the output 254*c* of a fourth two-input NAND gate 254. One input 253*b* and 254*b* of each of gates 253 and 254 is tied together to the P17, or ADDR, output of controller microcomputer 214. The remaining input 253*a* of gate 253 is tied to the collector electrode of address means transistor 241, while the remaining input 254*a* of gate 254 is connected to the collector electrode of address means transistor 242. Gate outputs 253*c* and 254*c* are also respectively connected to the controller microcomputer date inputs P20 and P21.

Another controller microcomputer output P15, forms an ENABLE line (forming a portion of bus 218) to ADC means 216. The analog-to-digital conversion means comprises a plurality (e.g. two) of single-slope analog-to-digital converters, utilizing a common switching transistor 260. In the illustrated embodiment, transistor 260 is of the NPN type, connected through a base resistance 261 to the ENABLE output of controller microcomputer 214, and connected through a load resistance 263 to operating potential +V. An integration capacitance element 265 is connected across the switching transistor. The inputs of a plurality of threshold switching subcircuits, equal in number to the number of analog-to-digital converters desired, are connected across integration capacitance 265. In the illustrated embodiment, a pair of threshold-switching subcircuits 216*a* and 216*b* are utilized. Each subcircuit has an output transistor 288*a* or 288*b* having the collector electrode thereof respectively connected through an associated one of load resistances 290*a* and 290*b* to operating potential +V; the collector electrodes of address means transistor 241 and transistor 288*a* and the third logic gate input 253*a* are connected together, while the collector electrodes of transistor 288*b* and address means transistor 242 are connected to the fourth logic gate input 254*a*.

That portion of controller microcomputer I/O 214*d* used for bidirectional communication with the central controller via bus 210*c*, is illustratively configured for operation with a bus-current-sensing central controller transceiver, such as described and claimed in the application Serial No. 089,478 filed Oct. 30, 1979, abandoned. Bus 210*c* may be a twisted wire pair. The incoming data is applied by transistor 296 to a receive-remote-data (RRD) input P22 of controller microcomputer 214. A transmit-data-to-remote (TRD) output P23, of controller microcomputer 214, is connected via another switching transistor 299, to bus 210*c*.

Oscillator means 230 and variable gain amplifier 228, forming DAC means 226, may be as described and claimed in the above-identified co-pending U.S. patent application Ser. No. 267,274. Briefly, oscillator means 230 utilizes an operational amplifier 301 as an astable multivibrator, producing a square-wave waveform output at a frequency slightly less than 10 KHz. A pair of series-connected resistance elements 302 and 303 are connected between operating potential +V and ground potential. The junction between resistors 302 and 303 is connected to the non-inverting input 301*a* of the operational amplifier and is also connected through a feedback resistance 304 to the amplifier output 301*b*. Another feedback resistance 305 is connected between output 301*b* and the inverting input 301*c* of the operational amplifier, while a timing capacitance 306 is connected between inverter input 301*c* and ground potential. The oscillator output waveform is applied through a first resistance 310 to the non-inverting input 312*a* of another operational amplifier 312. A variable resistance 314 is formed between non-inverting input 312*a* and ground potential, and includes a fixed resistance element 316 and a plurality of resistance elements 316*a*–316*n*, each having a first terminal connected to ground potential and a second terminal connected to one contact of an associated one of a like plurality of switch means 318*a*–318*n*. The remaining contact of all of switch means 318*a*–318*n* are connected to non-inverting input 312*a*. Switch means 318*a*–318*n* are manually actuatable at the location of control module 210 to allow manual selection of the attenuation applied to the oscillator output waveform. Switch means 318*a*–318*n* may be utilized to set a minimum level of the control signal to the load and therefore set a maximum load level, which may not be exceeded under remote central, or local, control.

Variable gain amplifier 228 also includes a plurality of resistance elements 320, illustratively being five resistance elements 320*a*–320*e*. Each resistor has a first terminal connected to an associated one of controller microcomputer data outputs P10–P14. The remaining terminals of resistance elements 320*a*–320*e* are connected together to an operational amplifier inverting input 312*b*. An operational amplifier output 312*c* is connected through a resistance element 322 to the base electrodes of a complementary-symmetry pair of transistors 324*a* and 324*b*. The collector electrode of NPN transistor 324*a* is connected to a source of output operating potential of magnitude $+V_1$, while the collector electrode of PNP transistor 324*b* is connected to ground potential. The emitter electrodes of both transistors 324*a* and 324*b* are connected via a coupling capacitance 326 to the load control data output bus 210*a* (here shown as a twisted wire pair). A feedback network 328 includes a plurality of resistance elements 330*a*–330*n*, each having a first terminal connected to the junction between the transistor emitter electrodes. The remaining terminal of each of resistors 330*a*–330*n* is connected to a first contact of an associated one of a like plurality of switch means 332*a*–332*n*, all having a remaining switch contact connected in parallel to operational amplifier inverting input 312*b*. A fixed resistance 330 may be used across the paralleled resistance-switch branch, to fix a maximum amplifier output level. Switch means 332*a*–332*n* may be manually operable or may be coupled to others of controller microcomputer outputs for programmable control (not shown).

Referring now to all of FIGS. 5, 5*a*, 5*b*, 5*c* and 6*a*–6*g*, pertinent portions of control module 210 operation are as follows: upon application of power to the control module, the controller microcomputer $\overline{RST}$ pin is given a positive potential, by action of resistance 235 and capacitance 236, releasing the microcomputer reset. Upon release of the reset status, the microcomputer program counter is set at an intial location in the firmware program stored in the ROM 214c portion thereof, entering the BEGIN step 350 of the program (FIG. 6a). The instructions stored in memory for the BEGIN step directs CPU 214a to the portion of ROM 214c in which is stored in INITIALIZATION OF PARAMETERS sequence (step 351): a constant, stored in the ROM, is utilized as the digital data bit pattern initially made available at controller microcomputer output lines P10-P14. Those of gain-select lines P10-P14 receiving a logic zero level appear as if connected to ground potential, while those lines receiving a logic one level appear as a substantially open circuit impedance level. The gain of amplifier section 228 is thus initially set by those of resistances 320a-320e connected to ground potential, to establish the magnitude of the waveform at control data waveform output 210a at a predetermined level; the magnitude of the output waveform cannot exceed the maximum amplifier gain set by manual control of switches 318a-318n and/or 332a-332n. The periodic waveform is transmitted on bus 210a to the at least one input control-ballast-lamp combination, with the input control portion thereof providing isolation and rectification of the periodic waveform to a D.C. level setting the associated lamp to a predetermined intial light output level.

During Initialization of Parameters in step 351, the controller microcomputer also transfers a maximum light level-setting data value MAXON from a storage location in ROM 214c to a selected storage location in RAM 214b. The MAXON data establishes the maximum amplitude to which the variable gain amplifier output waveform may be set, by putting a limiting value to the data bit pattern applicable to controller microcomputer output lines P10-P14. The data word is stored at a predetermined location in RAM 214b, so that the level thereof is capable of subsequent change by command from the central controller. (In the event that the control module is configured in the local-only mode, as hereinbelow described, the initial maximum light-level-setting data, permanently stored in the ROM, becomes an invariant maximum light level for all control circuit-ballast-lamp combinations controlled by that control module).

During Initialization of Parameters step 351, the controller microcomputer flags are also set to initial states. An ON/OFF flag is set to reflect the state of the lamp, such that if the initial level, previously established in the firmware program ROM 214c, is a level other than OFF, this flag is set to ON. The ON/OFF flag is set to OFF only if the lamp is to be initially off. A message-pending (MSG PEND) flag is utilized to signify, if set, that the central controller is waiting for data bus 210c to be free in order to have the particular control module 210 transmit a message, stored in RAM 214b, to the central controller. The MSG PEND flag is reset at initialization to indicate that a message is not then to be sent. An UP/DOWN flag, determining if the brightness of the lamp is to increase (UP) or decrease (DOWN), in response to closures of switch portions 245b-k, is initially set to the UP position, to allow the lamp to be powered up, if the ON/OFF flag is set to the ON condition. The UP/DOWN flag remains in the UP condition until the load level reaches the load level set as the maximum light level (MAXON), and then changes to the DOWN condition. This flag is maintained in the DOWN condition until the load output level reaches a minimum allowable level (MINON), if used, or until reset to the UP condition.

After the parameters have been initialized, the firmware program proceeds to step 352 wherein a readlocal-address (RDADR) subroutine (shown in FIG. 3b of co-pending application Ser. No. 267,328, now U.S. Pat. No. 4,425,628 is called. Since a common firmware program is utilized for all control modules in an energy-control system, the unique local address assigned to a particular control module 210 must be read into the control microcomputer from address means 232 at the commencement of operation, and before the control module can respond to command information on bus 210c from the central controller. The 12 bit address word is then read into the RAM 214b section of the controller microcomputer. It will be seen that this allows $2^{12}=4096$ distinctly-addressed control modules to be connected to a single central controller data bus 10c and individually addressed. The particular address remains stored in RAM 214b as long as the control module is receiving operating potential. This address will be subsequently used for comparison against the address portion of any transmission from the central controller and also as a preamble in any message transmission back to the controller, as may be initiated from control module 210 by the central controller.

The main program now proceeds to step 353, wherein a BLSCON subroutine is called to determine if the control module is connected to the central controller data bus 10c. The BLSCON subroutine (as shown in FIG. 3c of the aforementioned application Ser. No. 267,328) is required as the control module may operate in two distinct modes: A local (LOCAL) mode in which data bus 210c is not connected to a central controller and load output level is controlled by local control means 211 and local sensors 212; or a programmable general (PROG) mode, in which data bus 210c is connected to the central controller and in which maximum (and/or minimum) output levels (MAXON and MINON) and output values therebetween, can be set by the central controller, with or without override by local control means 211 and with or without reference to the data from local sensors 212. In the PROG mode, control module 210 can also transmit information over central controller data bus 210c in response to commands from the central controller. The particular BLSCON subroutine 353 used here is based upon use of control module 210 in the bidirectionally communicating energy management system of the aforementioned pending application Ser. No. 089,478. The BLSCON subroutine returns to the main program prior to a LOOP node 355.

The initialization phase is now complete and the module is now ready to process commands from switch means 211 closures or from the remote central controller.

MAIN LOOP-LOCAL MODE

Having been initialized, control module 210 will be in the LOCAL mode if the BLSCON subroutine of step 353 ascertains that bus 210c is not active within a preselected time interval, e.g. 200 milliseconds. In the LOCAL mode (or with a local switch LSFLG flag enabled in PROG mode), local switches 245-1 through 245-n may be utilized to increase or decrease the load output level dependent upon the state of an UP/DOWN flag, which is itself controlled by closure of one of switch portions 245a-1 through 245a-n to place ground potential on bus 210b input 246a; the magnitude of load output level change, once the change direction is set, is dependent upon the duration of closure of one of switch portions 245b-l through 245b-n to place ground potential on bus 210b input 246b. Local sensors 212 may or may not be utilized in a particular application, with the control module either in the local or remote-control mode.

Figure 6B:
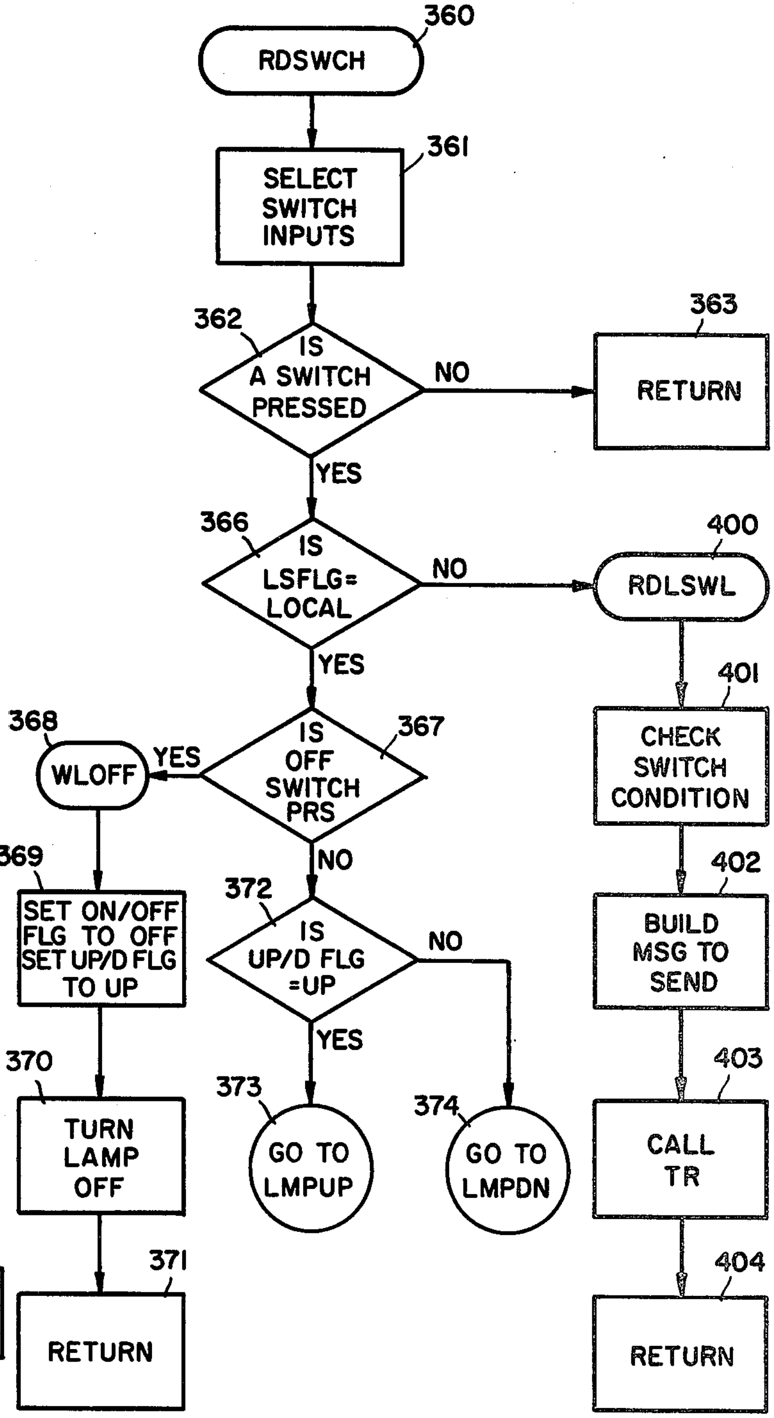
Figure 6A:
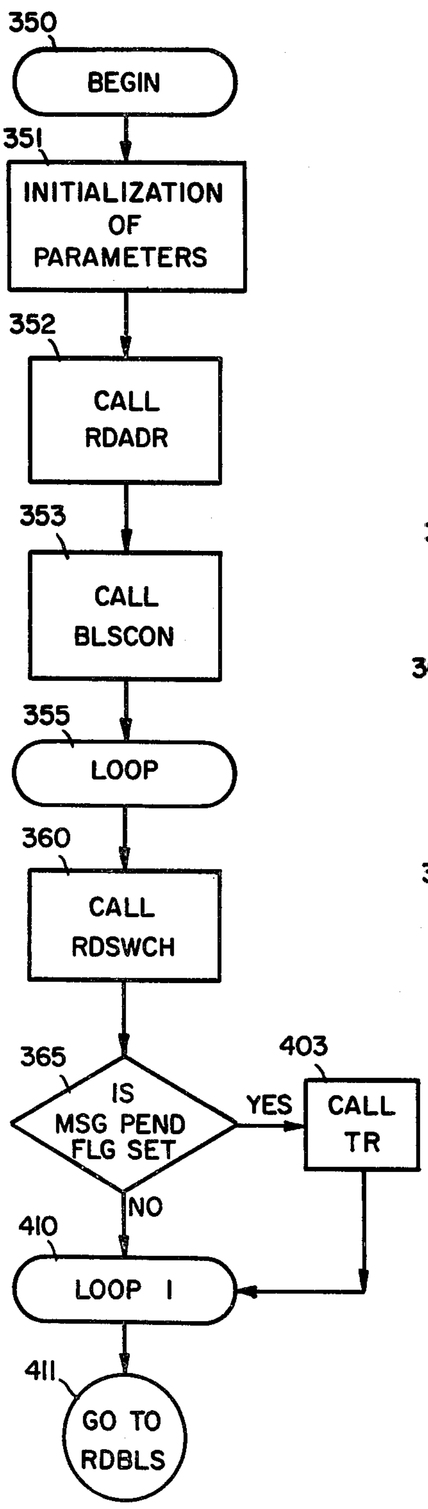
Figure 6D:
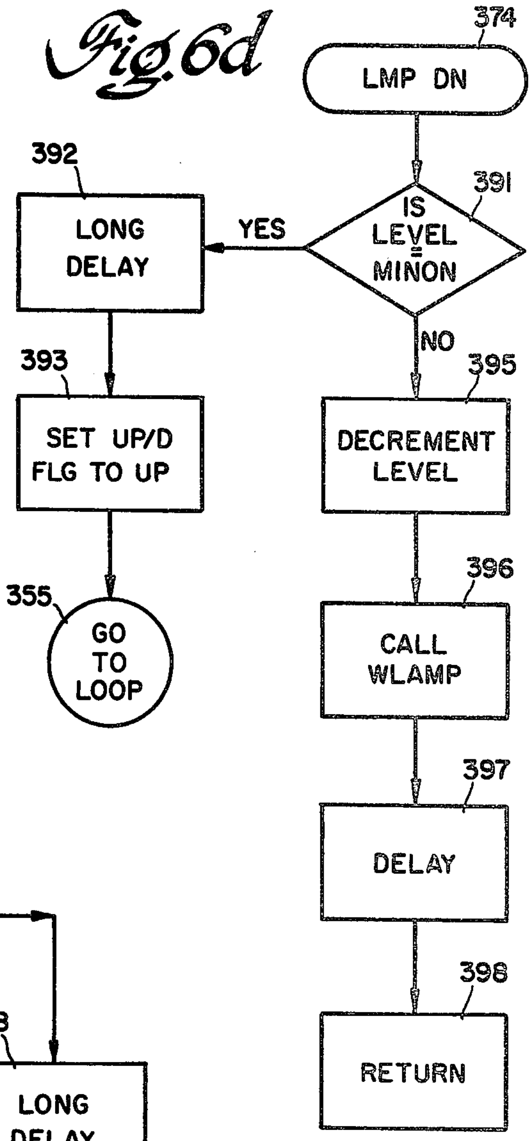
Figure 6C:
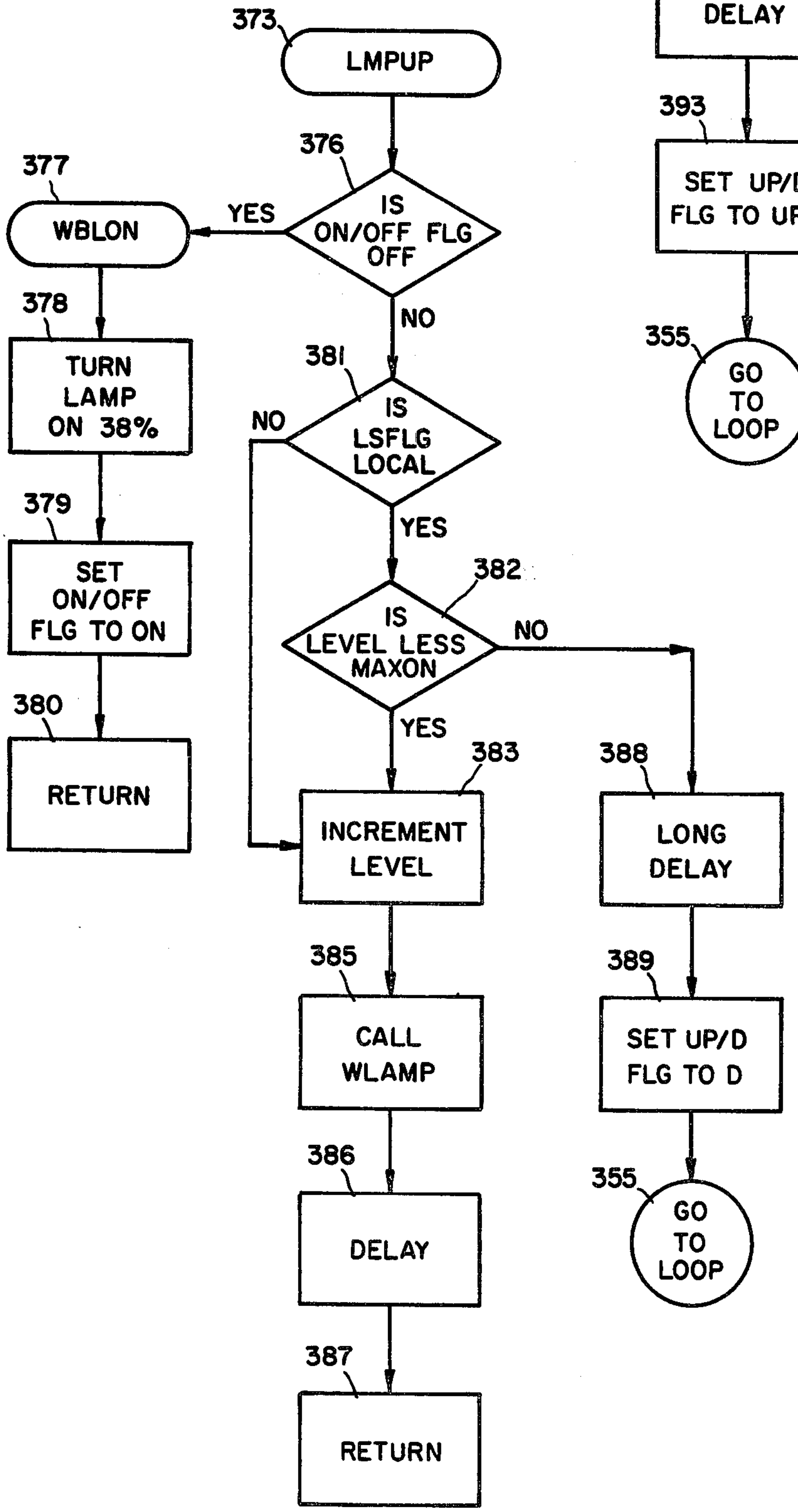
Figure 6E:
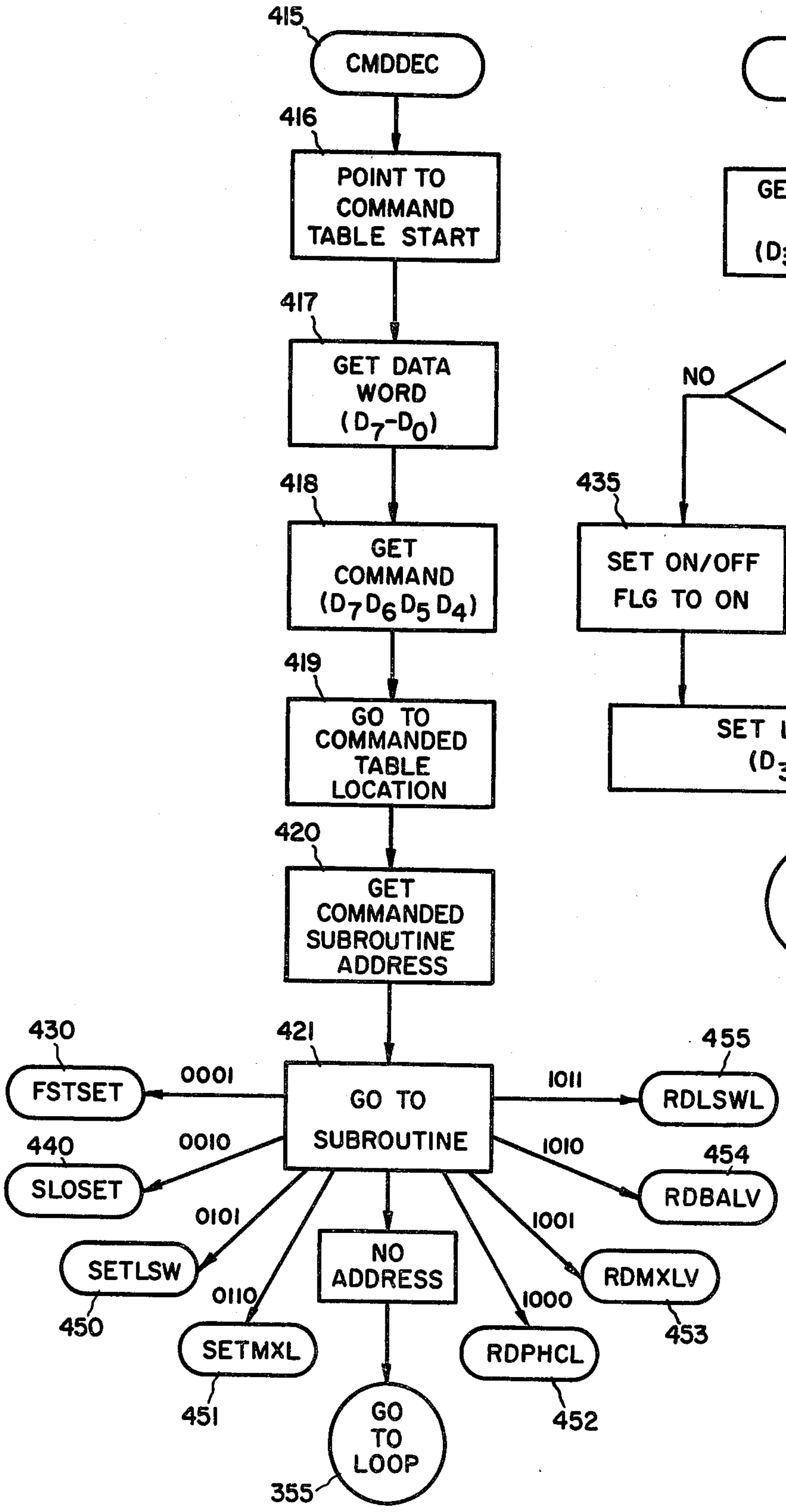

The main LOOP commences by passing from LOOP node 355 to call the switch-reading subroutine (RDSWCH) at step 360 (FIG. 6b). In step 361, the ENABLE line at the P15 output, and the ADDR line at output P17, are switched to a logic zero level effectively removing the open-collector NAND gates 253 and 254 from connection to inputs P20 and P21. The logic levels at the P20 and P21 inputs are now set directly by the associated logic gate outputs 251c and 252c, respectively. The controller microcomputer P16, or SWITCH, output is enabled to provide a logic one level to enable gates 251 and 252. If all members of both switch portions 245a-k and 245b-k are open, both inputs P20 and P21 receive logic zero inputs. If any one member of either of switch portions 245a-k or 245b-k are closed, the associated input 246a or 246b is connected to ground potential, the associated gate input 251a or 252a, respectively, receives a logic zero input and the associated gate output provides a logic one signal to the associated controller microcomputer input P20 and P21, respectively, indicative to a switch closure. The controller microcomputer 214 therefore checks its inputs P20 and P21, immediately after enabling the P16 output and determines if a logic one level exists on either input, indicative of a switch-pressed decision (step 362). If a switch has not been closed, a NO decision results and the subroutine enters the RETURN step 363, returning to step 365 in the main LOOP sequence. If either input P20 and P21 is a logic one, a YES switch-pressed decision results, taking the subroutine to next decision step 366. The CPU checks the flag register and determines if the LSFLG flag is set to the LOCAL condition. If the LSFLG flag is in the LOCAL position, another decision step 367 occurs, wherein the state of ON/OFF switch sections 245a-k are checked for OFF presence (PRS). If the switch section is being continuously pressed to provide an OFF level, the firmware program enters the immediate-lamp-off (WLOFF) subroutine at step 368. The CPU (step 396) sets the ON/OFF flag to the OFF condition, indicative of the load being turned off, and sets the UP/DOWN flag to the UP condition, indicating that the load is at a minimum value and that subsequent level changes must be in the UP direction. The present load level data is stored in a predetermined location in RAM 214b, for use when the lamp load is subsequently turned ON.

In step 370, the lamp is turned off, by controlling outputs P10–P14 to provide a periodic waveform signal of that value which turns the input control-ballast-lamp load combination to the off condition. Having completed the WLOFF subroutine, the program returns, at step 371, to the main LOOP after step 360.

Returning to step 367, if the OFF switch has not been pressed, the status of the UP/DOWN flag is checked in decision step 372. If the flag is in the UP position, the subroutine continues to an increase-output-level subroutine LMPUP subroutine, at step 373; if the flag is in the DOWN position, the program continues to a decrease-output-level subroutine LMPDN at step 374.

The LMPUP subroutine step 373 (FIG. 6c) commences, at step 376, by re-checking the ON/OFF condition of the switches. If the switch is in the ON condition, and the ON/OFF flag is "off" step 376 directs the program to the WBLON sequence, starting at step 377, to turn on the lamp. The load is programmed to a predetermined specific level, e.g. 38 percent of maximum output, in step 378, and the ON/OFF flag is set to the ON condition in step 379. Having now implemented the local switch signals, which require the lamp to be on with reduced input, the program enters step 380 and returns to the main LOOP program at the end of step 360.

If, during the check of step 376, the OFF condition does not obtain, the program is directed to step 381, wherein the LSFLG flag is checked for being in the LOCAL condition. If the local flag is not set, the program jumps to step 383 (to be discussed hereinbelow); if the local flag is set to the LOCAL condition, the program enters the decision step 382. In step 382 the level is checked against the currently established maximum allowable level MAXON, which was, as hereinabove described, transferred to the RAM from the ROM at initialization, and which may be revised by data from the remote central controller if the programmable mode is subsequently utilized. If the load output level is less than the MAXON level, or if the LSFLG flag was not set to the LOCAL condition (step 381), the program enters step 383 and increments the load output level. The actual level change is carried out by a WLAMP subroutine, in step 385, to provide a smooth level change, utilizing the slow-output-change method described hereinabove with respect to FIGS. 3a–c. As that method utilizes at least one controller microcomputer counter-timer, continued execution of the program is delayed in step 386, until the level changes have been executed. In particular, when a slow change in light level is required, either in response to a "set light level slow" command from the central controller (discussed hereinbelow with respect to FIG. 6f) or to closure of the ON/OFF switch section 245a to set the "ON" condition, and subsequent closure of the "CHANGE" switch section 245b for a particular amount of time, the following procedure is followed: The controller microcomputer assigns three locations in the RAM portion 214b thereof as counter-registers. The first counter register is utilized to hold basic system time constant data, transferred thereto from ROM portion 214c; the ROM value will be different for different systems, dependent upon the time constant necessary for the load, e.g. the ballast-lamp combination, to effect an output change therein. The second and third counter registers contained basic system time constant multipliers, having values varying in accordance with the time constant with the total system and which, in the present preferred embodiment can vary between values of 1 and 255 (for an eight-bit register). To effect the slow change of level, microcomputer 214 initializes all the counter-registers and then provides the new level data at the P10–P14 output thereof, setting the variable gain of circuit 226 to the new value, for a time period equal to the basic system time constant value. Thereafter, the old, or former, output level data is provided at the P10–P14 microcomputer outputs for a period of time much greater than the basic system time constant value, e.g. for about 100 times the basic system time constant value. Thereafter, the count in the second counter register is incremented by one (e.g. to a count of two) while the count in the third counter register is decremented by one (e.g. to a count of 99). The new level data is then provided at the P10–P14 outputs for a time interval equal to the product of the count in the first and second counter-registers, e.g. two times the basic system time constant, and then the old level data is output for a time interval equal to the product of the counts in the first and third counter-registers, e.g. for about 99 times as long as the basic system time constant. Incrementation of the second counter-register and decrementation of the third counter-register continue; the amount of time at the new level of output steadily increases while the amount of time at the old level of output steadily decreases. This process continues until the second counter-register is fully incremented, say to the count of 100, and the third counter-register is fully decremented to a count of zero. At such time, the controller microcomputer then outputs the data for the new level continuously. Thus, the output load level has changed discretely but appears to an observer (due in part to the integrating properties of both the lamp phosphor and the human eye) to have slowly and continuously changed, due to the gradual change thereof. After the slow level change is complete, program step 387 is entered and the program returned to the end of step 360 in the main LOOP.

If, in step 382, a comparison finds that the output level is not less than, or equal to, the MAXON value, step 388 is entered and a long delay begun to let the switch operator know that a change will not be occurring. At the end of the delay, since the output level cannot increase beyond the maximum presently-set level, the UP/DOWN flag is set, in step 389, to the DOWN condition, indicative of the need for any further changes in the load output level to be of a decreasing nature. Having set the UP/DOWN flag the program returns to LOOP node 355 at the beginning of the main loop, to check for additional switch instructions, which may request a reduction in load output (as further load output increases cannot be presently obtained).

If an output level decrease is commanded, the RDSWCH subroutine will eventually enter the LMPDN step 374, as previously described hereinabove, and the sequence of FIG. **6*d* commences. In step 391, the present commanded load output level is checked against the minimum selectable output level MINON. If the minimum selectable output level is presently used and the load output is equal to that level, the program passes through a long delay step 392 and then, in step 393, resets the UP/DOWN flag to the UP condition, indicative of the need for interpreting the next closure of the UP/DOWN switch section (in step 367) as an UP command. After setting the flag, the program returns to LOOP node 355 to reenter the RDSWCH subroutine (step 360**) and reinterpret any continued closure of the UP-DOWN switch as a request to increase the light level.

If the level comparison step 391 found that the present load level was not at the MINON level, step 395 is entered to decrement the present level. Having reduced the commanded load level in step 395, a smooth level change is carried out by calling the WLAMP subroutine, in step 396; the WLAMP subroutine, being one computer implementation of the slow-change (or ramp) method of the present invention, was previously described hereinabove with reference to step 385. While the WLAMP smooth-level-change procedure is occurring, the program goes through a delay step 397 until the controller microcomputer has finished use of its internal counter-timer, at which time step 398 occurs and the program returns to the end of step 360 of the main LOOP.

MAIN LOOP-PROG. MODE

If, in step 353, the remote central controller data bus **210*c* was determined to be connected to control module 210, LOOP node 355 is still followed by the RDSWCH subroutine step 360. The previously described steps 361–366 occur; however, the result of comparison step 366 will be a NO result as the LSFLG flag is set to the PROG condition. The program now enters the RDLSWL subroutine, of step 400 (FIG. 6*b*). The controller microcomputer checks the switch conditions in step 401, and forms, in predetermined locations in RAM 214*b* thereof, a message containing the contact status of each switch, for eventual transmission to the central controller (step 402). Once the message has been "built" in its RAM storage space, the program calls a message transmission (TR) subroutine at step 403 (and shown in FIG. 3*g* of the aforementioned application Ser. No. 267,328). After the TR subroutine is run, the program enters step 404 and returns to the end of RDSWCH main program step 360**.

The message transmission TR subroutine, as well as the messages transmitted to control module 210 from the central controller, utilizes a 40-bit message format, as shown in FIG. **5*c***. This five-bite message commences with a "flag" word providing three true flag bits $F_2$–$F_0$ and three complementary flag bits $F_2$–$F_0$, followed by address bits $A_9$ and $A_8$. An "address" word transmits the eight least significant-bits $A_7$–$A_0$ of the control module address. A "function" word has the two most-significant-bits $A_{11}$ and $A_{10}$ of the control module address, followed by a fixed 3-bit sequence (011) and three-function bits $f_2$–$f_0$, for transmission of control module function information to the remote central controller. A "data" word, having eight data bits $D_0$–$D_7$, utilizes the high-order nibble of data bits $D_4$–$D_7$ for transmission of one of 16 possible command numbers; the low-order nibble, of data bits $D_0$–$D_3$, contains four bits of command data, if present, for the associated command number transmitted in the high-order nibble. Finally a "parity" word, having eight parity bits $P_0$–$P_7$, is transmitted. The complementary flag and true-flag bits are utilized for transmitting status information on, or setting status of, the ON/OFF, UP/DOWN, LOCAL/PROG, LSFLG, BLSFLG, SENSOR-ENABLE, etc., flags in the CPU flag register. In the presently preferred embodiment, data is sent by pulse-width-modulation, with the length of each data bit pulse being predetermined in both the logic one and logic zero states. It should be noted at this point that the controller microcomputer can receive data at various rates, although transmission must be by use of the predetermined-pulse-width technique.

Having read the switch data in either the local or remote modes, the RDSWCH subroutine 360 is complete and the main LOOP program now checks the message pending flag in step 365. If the message pending flag is set, the program calls the message transmission TR subroutine, as in previously-described step 403. Upon completion of the TR subroutine, or if the message pending flag was not set, the main program is rejoined at the LOOP 1 node 410 and proceeds to call a RDBLS subroutine step 411 (described with respect to FIG. 3*h* in the aforementioned co-pending application 267,328), to obtain an incoming message.

After the entire message, e.g. 40 bits of data, is decoded and stored in the microcomputer RAM, the microcomputer proceeds to interpret the message by initially checking the received flag bits $F_0$–$F_2$ and $\overline{F}_0$–$\overline{F}_2$. If the received flag bits are equal to a flag-bit sequence predeterminately selected to identify a transmission as one for a control module, the decoding is allowed to continue to a parity check. Thereafter, the received message address portion is checked against the stored address portion established during RDADR. If the unique address of that control module is not received, the transmission is ignored. If the particular control module address is received, the RDBLS subroutine continues on to the decode command CMDDEC step 415 of FIG. 6*e*, where the four command number bits $D_4$–$D_7$ of the "data" word are checked to determine which of 16 command numbers is being called for. The lower four-bits $D_0$–$D_3$ of the "data" word provide data necessary for performance of several of the commands.

The command numbers are decoded by means of a table structure. The command number data bits are arranged in the order $D_7$, $D_6$, $D_5$, $D_4$, and provide a four-bit nibble utilized as an index to a predetermined table stored in ROM 214*c*. Thus, in step 416, the firmware program points to the start of the command table and then, having obtained the command data word in step 417, utilizes the command number found in step 418 to go to the command location in the command table in step 419. At the command table location is located the address for the start of the particular subroutine program previously set in the firmware for that one of the command numbers received in step 420. The command subroutine address is called in step 421; only the fast-setting FSTSET subroutine of FIG. 6*f* and the slow-setting SLOSET subroutine of FIG. 6*g* will be considered herein, the remaining subroutines may be found in co-pending application Ser. No. 267,328.

PARTIAL COMMAND TABLE

| Command Number | Binary Representation | Subroutine Label | Command Function |
|---|---|---|---|
| 1. | 0001 | FSTSET | Set Light Level Fast |
| 2. | 0010 | SLOSET | Set Light Level Slow |

Figure 6F:
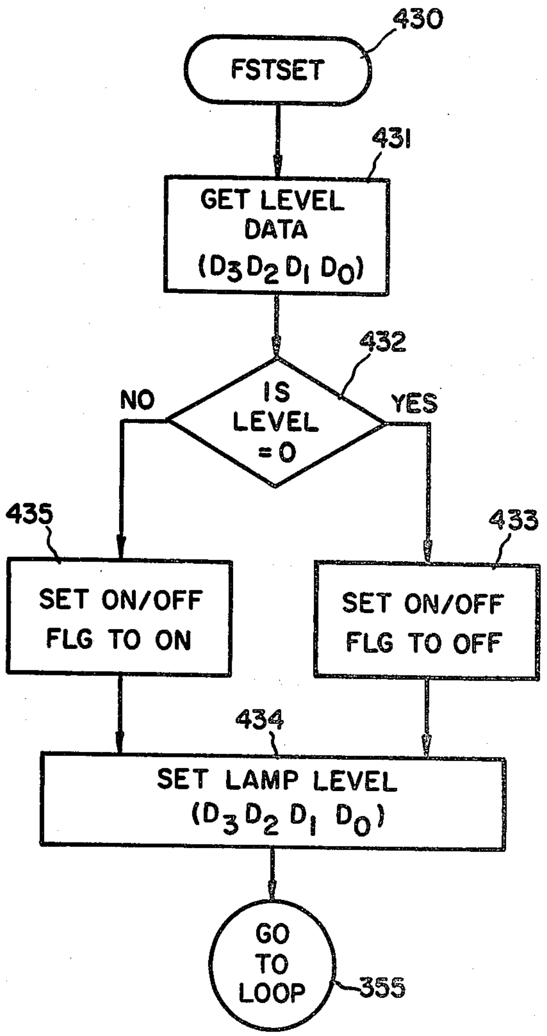

If the 0001 data bits are utilized for the command number, step 430 (FIG. 6*e*) calls the FSTSET subroutine of FIG. 6*f*. The command data $D_3$, $D_2$, $D_1$ and $D_0$ for the level associated with the "set light level fast" command is obtained from memory in step 431 and is compared, in decision step 432, to the zero, or load off, level. If the commanded level is the zero level, the ON/OFF flag is set to OFF in step 433 and the commanded level now given by the four-bit data sequence $D_3$, $D_2$, $D_1$ and $D_0=0000$, is set in lamp level-setting step 434. If the commanded level is not a zero level, step 432 is followed by step 435, where the ON/OFF flag is set to the ON condition. Step 434 is then entered and the lamp level is set to the non-zero level specified by bits $D_0$–$D_3$ of the data transmission. After the lamp level is set and the new level data stored, the subroutine exits through step 436 to the LOOP node 355 of the main program.

Figure 6G:
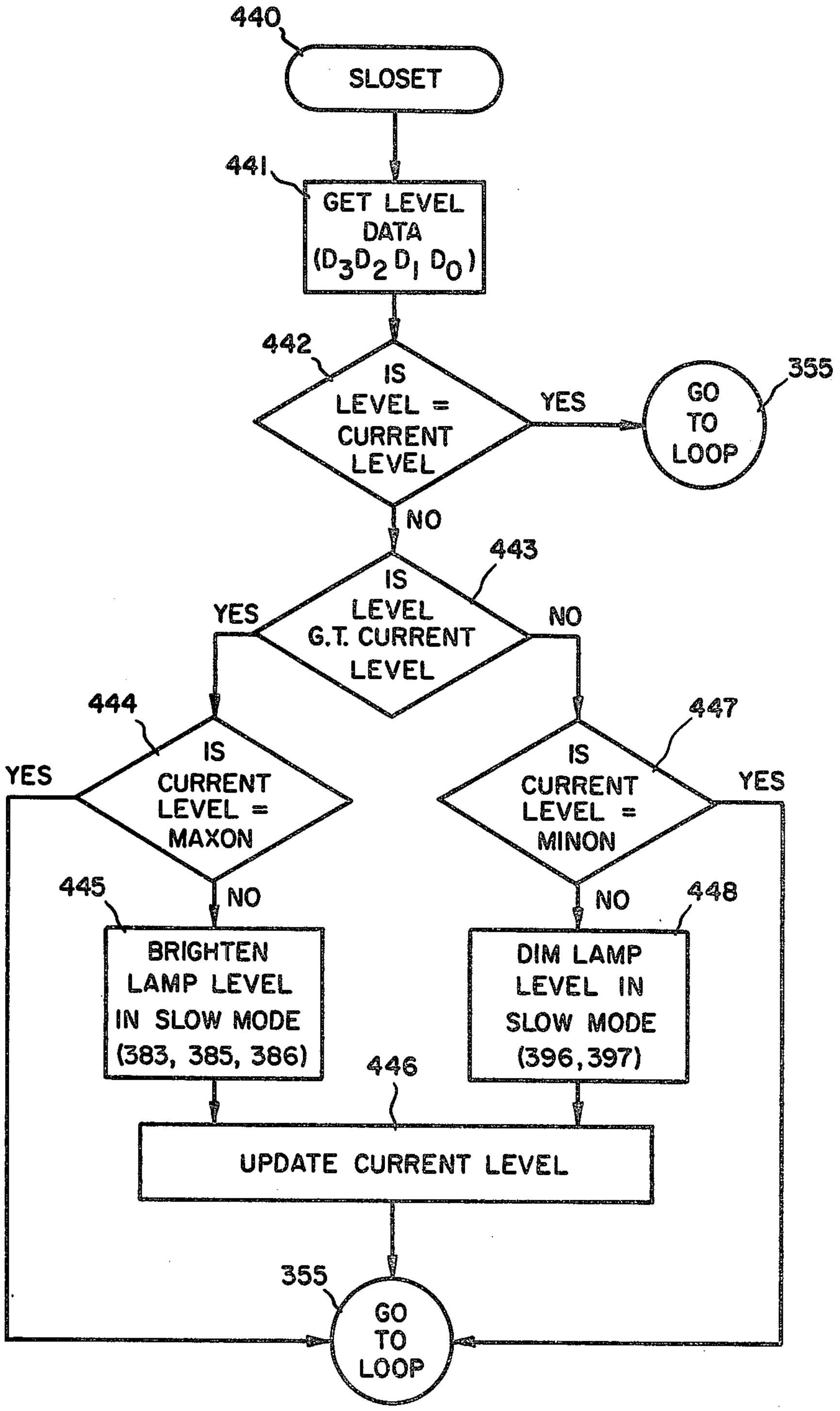

If the command number is 0010, step 440 calls the SLOSET subroutine of FIG. 6*g*. This "set light level slow" command causes the control module to set the associated load lamp level to the value established by the command data nibble in the four bit sequence $D_3$, $D_2$, $D_1$ and $D_0$. Accordingly, the level data is obtained from the stored received transmission in step 441. The level data, in decision step 442, is compared to the current lamp level; if the current lamp level is the newly commanded level, no further action is required and the program exits to LOOP node 355. If the current level is not equal to the new command level data received, step 442 exits to a decision step 443, wherein a decision is made as to whether the new level data is greater than the current level. If the new level is greater than the current level, decision step 444 is entered and the current level is compared to the maximum load limit MAXON. If the current level is already at the maximum limit, no further increase in level can be programmed and the program exits to LOOP node 355. If the current level is not equal to the maximum-set level (MAXON), the program continues to step 445, wherein the lamp level is increased (brightened) in the "slow" mode, utilizing program steps 383, 385 and 386, previously discussed hereinabove. After the lamp has been brightened, the new level data is stored in RAM 214*c* as the updated current level (step 446). If, however, in step 443, the newly commanded level was found to not be greater than the current level, decision step 447 is entered and the current level is compared to the minimum-set level MINON, which may be the zero level if a particular value of MINON has not been programmed. If the current level is the minimum-set level, no further decrease in load level can be programmed and the program exits to LOOP node 355. If the current level is not yet equal to the minimum-set level MINON, the program continues onto step 448, wherein the output lamp level is decreased (dimmed) in the slow mode, utilizing steps 396 and 397, previously discussed hereinabove. After dimming of the lamp level in step 448, the current level is updated, again in step 446, utilizing the new data, and the program returns to the LOOP node 355.

Referring now to FIGS. 5, 5*c*, 7 and 7*a*, the presently preferred control module embodiment 210' utilizes a Texas Instrument TMS1100 4-bit single-chip microcomputer for controller logic means 214'. Operating potential of magnitude $-V$ is applied between the microcomputer power supply input $V_{DD}$ and ground $V_{SS}$. The negative operating potential is also applied to the anode of an initialization diode 450 having its cathode connected to an initialization INIT input of microcomputer 214'. The INIT input is also connected to one terminal of a capacitor 451, having its remaining terminal connected to ground potential. Upon application of operating potential, the controller microcomputer is reset by the action of diode 450 and capacitor 451. An internal clock signal is provided within controller microcomputer 214', at a frequency selectable by the value of a potentiometer 453, coupled between operating potential $-V$ and an oscillator OSC input, in conjunction with a timing capacitor 454, connected from the OSC input to ground potential.

The particular controller microcomputer 214' includes a RAM of 128 4-bit words and a ROM of 2K bytes of memory, in addition to a I/O section having a single 4-bit input port (consisting of inputs K1, K2, K4 and K8) and a pair of output ports including a parallel output O port of at least lines OØ–O5, and an individually-latched 11-bit R port (including lines R0–R6).

Address selection means 232' is comprised of a plurality of address selection elements A, each including a series diode fusible link combination. Each of individually-settable/resettable outputs R3–R6 is connected to the anode of a selected diode of one of the plurality of series diode-link combinations. The remaining link-end terminal of each combination is connected to one of inputs K1–K8. A pair of outputs 222a' and 222b' (of local control interface means 220') are connected to associated diodes D1 and D2, respectively, to respective first and second microcomputer data inputs K1 and K2. In addition, the collector electrode of a switching transistor 457 is connected to the K8 input, with the emitter electrode of transistor 457 being connected to the first R output line R0. A pull-up resistor 459 is coupled between input R0 and operating potential −V. One of a pair of diode-link series combinations %0 and %1 are connected between a selected R output (e.g. the R6 output) and an associated one of the K1 and K2 inputs, for a purpose hereinbelow explained.

The central controller bus 210c' is connected to control module I/O means portion 214d'. Bus 210c' is herein illustrated as a 2-wire pair respectively connected through isolation resistors 460a and 460b to respective input/output terminals 461a and 461b. Incoming data is buffered by circuitry 462, utilizing a differential-input amplifier 465. The non-inverting input 465a of the differential amplifier is connected through a resistance element 467a to a first one of the I/O bus terminals 461a, while the inverting input 465b is connected to remaining I/O bus terminal 461b through another resistance 467b. One of Resistance elements 468a and 468b is connected between ground potential and each respective one of non-inverting and inverting inputs 465a and 465b. A pair of resistance elements 469a and 469b are connected between operating potential −V and a respective one of inputs 465a and 465b. The output of amplifier 465 is coupled to a pair of resistance elements 470 and 472 in series to ground potential. The output 473 of the received-data buffer 462 is taken from the junction between resistance elements 470 and 472 and is connected to the base electrode of transistor 457.

For transmitting data from microcomputer controller 214' to the central controller on bus 210c', a transmitted-data buffer circuit 475 is utilized. The data to be transmitted is serially read out of individually-selectable output line R1, to the light-emitting diode portion 477a of an optoelectronics isolator 477. Diode 477a is series connected wth a current-limiting resistance 479 between output line R1 and operating potential −V. A phototransistor 477a, forming a remaining portion of isolator 477, is responsive to the flux emitted from diode 477a. The collector electrode of phototransistor 477b is connected to I/O bus terminal 461a and to the cathode of a diode 480 having its anode connected to the phototransistor base electrode. The phototransistor base and emitter electrodes are connected through a resistance 481. The phototransistor emitter electrode is connected directly to the base electrode of another transistor 483, having its collector electrode connected to bus terminal 461a and its emitter electrode connected to bus terminal 461b. A resistance 485 is connected between the base and the emitter electrodes of transistor 483. A pair of noise-filtering capacitance elements 486a and 486b are connected between ground potential and a respective one of input/output bus terminals 461a and 461b. Data-receiving circuit 462 and data-transmitting circuit 475 are utilized with the aforementioned bus-current-sensing central controller transceiver, such as described in the aforementioned application Ser. No. 089,478.

Local control interface means 220' has a pair of inputs 220a' and 220b', which are respectively connected by bus 210'b to opposite selectable terminals of each of at least one single-pole, double-throw switch means 211', each having a common terminal connected to a ground potential line of the bus. Each of inputs 220a' and 220b' is respectively connected to operating potential −V through a first resistance element 490a or 490b, each respectively shunted by a normally-reverse-biased diode 491a and 491b, respectively, to prevent the bus input voltages from exceeding the operating potential magnitude. Other normally-reversed-biased diodes 492a and 492b are respectively connected between respective inputs 220a' and 220b' and ground potential to prevent the bus input voltage from attaining a positive polarity. Each of a pair of resistance elements 493a and 493b is respectively connected between a respective one of inputs 220a' and 220b' and an associated local control interface means output 222a' and 222b', respectively. Noise-filtering capacitances 494a and 494b are respectively connected to ground potential from a respective one of local control interface means outputs 222a' and 222b'.

The analog-to-digital conversion means 216' of this embodiment utilizes the R2 individually-enabled output line as the ENABLE line thereto. The collector electrode of a switching NPN transistor 500 is connected to the negative operating potential and the emitter electrode of transistor 500 is connected through a resistance element 501 to ground potential. An integration capacitance element 503 is connected between the emitter and collector electrodes of transistor 500. The base electrode of transistor 500 is connected through a resistance element 505 to the R2 output of microcomputer 214'. The R2 output is connected through another resistance element 506 to the negative operating potential bus. The integration capacitance-switching transistor emitter junction is connected through a resistance element 508 to a non-inverting input 510a of a differential-input operational amplifier 510. The non-inverting input 510a is connected to the operational amplifier output 510b via a feedback resistance 512. Amplifier output 510b is connected to the ADC means output 216'x and thence to the anode of a multiplexing diode $D_3$ having its cathode electrode connected to the third bit input K4. The operational amplifier inverting input 510c is connected to ground potential via a capacitance element 514, paralleled by the series combination of a pair of resistance elements 515 and 516. The junction between the resistance elements 515 and 516 is connected to one terminal of another resistance element 517, having its remaining terminal connected to one line of the sensor bus 210d' (and thence to one terminal of sensor 212') and to one terminal of a variable resistance 518. The remaining terminal of resistance 518 is connected to the operating potential −V bus and to the remaining sensor bus 210d' line (and thence to the remaining terminal of external sensor 212').

The DAC means 226' utilizes oscillator means 230' and variable gain amplifier means 228'. Oscillator 230' is substantially identical to oscillator 230 of FIG. 5a, with the exception that, due to the change from a positive operating potential to a negative polarity operating potential, resistance 303' and capacitance 306' are returned to negative potential, rather than ground potential, as in FIG. 5a. An additional resistance element 520 is connected as a pull-up resistance between negative operating potential −V and a designated one of the O-port lines, e.g. $O_5$. Additionally, that terminal of resistance element 302′ furthest from operational amplifier 301′ is also connected to the $O_5$ output, whereby oscillator means 230′ which normally outputs a square-wave of variable amplitude at a frequency less than 10 $KH_z$ for lighting control, may be used to provide a pulsed waveform of approximately 15% duty cycle (at essentially the same frequency) for providing an "off" signal, when the Ø-05 outputs are set. This is the only use, in this embodiment, of the 05 output line.

Variable gain amplifier 228′ is a 5-bit multiplying digital-to-analog converter, having the multiplication factors (gain) thereof established by the binary data pattern at the five O output lines Ø-04 of controller microcomputer 214′. These five output lines form bus 224′ and are respectively connected to one terminal of each of the five resistance elements **320*a*′-320*e*′. The remaining terminal of resistance elements 320*a*′-320*e*′ are connected together. An operational amplifier 530 is used, and may, advantageously, be one-fourth of a quad comparator-amplifier integrated circuit (such as the National Semiconductor Corp. Type LM 339) with the three remaining units therein being used for amplifiers 301′, 465 and 510. The common terminals of resistance elements 320*a*′-320*e*′ are connected to both the non-inverting input of the operational amplifier 530 and through a diode 531 and series resistance 533 to negative operating potential −V. The operational amplifier output 530*b* is connected to the base electrode of a transistor 532 and is also connected through a parallel network of resistance 534 and capacitance 535 to ground potential, along with the collector electrode of NPN transistor 532. The emitter electrode of 532 is connected to: oscillator input 230*a*′ (at the junction between resistance elements 304′ and 522); a feedback capacitance element 537 having another terminal coupled to the inverted operational amplifier input 530*c* via first and second series fixed resistance element 538 and 539 and a variable resistance element 540 to negative operating potential; and through resistance elements 542 and 544 respectively to the respective emitter electrode of each of a pair of PNP transistors 546 and 547. A junction between resistance elements 538 and 539 is connected to the cathode of a diode 549, having its anode connected to inverting operational amplifier input 530*c*. The base electrodes of transistors 546 and 547 are connected together, to the collector electrodes of transistor 547 and through a resistance element 550 to operating potential −V. The collector electrode of transistor 546 is connected to the base electrodes of a complementary-symmetry pair of output transistors 552 and 553, to the collector electrode of a NPN transistor 554; and through a series network of resistor 555 and capacitor 556, to ground potential. The emitter electrode of transistor 554 is connected to negative operating potential, as is the collector electrode of transistor 553. The base electrode of transistor 554 is connected through a parallel network of resistance 558 and capacitance 559, to oscillator output 230*b*′, itself connected to negative operating potential −V via a capacitance 560. The collector of output transistor 552 is connected to ground potential and the emitters of both transistors 552 and 553 are connected together and via an output capacitance 562 to the active one of a pair of lines forming load data bus 210*a*′**. The remaining load bus line is connected to ground potential.

Comparator 530 is a low-frequency amplifier with resistance element 534 and capacitive element 535 providing a break point at a relatively low frequency. Amplifier transistor 532 is utilized to allow the voltage at the low frequency amplifier output (the emitter electrode of transistor 532) to be pulled-up to within one base-emitter diode-drop of the most positive voltage in the circuit, i.e. ground potential. Gain of this amplifier is set by the effective resistance between the negative operating potential and inverting input **530*c*, and is therefore established by the series combination of resistance element 539 and adjustable resistance 540. This amplifier will act, in conjunction with resistance elements 320*a*′-320*e*′ and 534, as a digital-to-analog converter, whereby, with proper scaling of resistance elements 320*a*′-320*e*′, the voltage at the amplifier output (transistor 532 emitter) will change in equal steps as the digital representation at outputs $O_0$-$O_5$ sequentially changes. Thus, the O outputs represent open-drain PMOS devices which can be pulled-up to the positive, or ground, potential, to place an associated one of resistance elements 320′ in circuit, to establish the output amplitude; when the output is disabled, the outtput devices float and disconnect the associated resistor from circuit gain-setting operation. Diode 531 provides an offset voltage to allow matching of the circuit output 210*a*′ voltage amplitude to the characteristics of the subsequent load to be controlled. Feedback loop diode 549 is utilized to compensate for any temperature effects provided by offset diode 532**.

Illustratively, the load, to be controlled by the waveform amplitude and output **210*a*′, can be controlled to an "off" and 15 different discrete "on" levels. Accordingly, only four output lines, and associated resistance elements, would normally be required. A fifth output ($O_4$) and associated resistance element (320*e*′) are utilized when the load is to be controlled to the zero-th, or "off", level, due to the peculiarities of the particular load, which requires an "off" input voltage which is not a linear step, relative to the linearly-changing "on" levels. The value of resistance element 320*e* is accordingly chosen, in conjunction with the values of resistance elements 320*a*′-320*d*′, such that transistor 532** will be saturated when outputs $O_0$-$O_4$ are enabled.

The variable D.C. voltage at the transistor 532 emitter electrode is coupled to the feedback resistance elements 304′ and 522 of the square-wave oscillator formed comparator 301′ and the associated passive elements. The frequency of the waveform at the comparator output **301*b*′ is a function of resistance elements 304′, 305′ and 522 and capacitive element 306′, as well as the effective resistance between negative operating potential −V and comparator non-inverting input 301*c*′. For normal, variable-load-output operation, the microcomputer $O_5$ output is disabled (i.e. an open circuit) and resistance elements 520 and 302′ are values selected such that, when paralleling resistance element 303′, the total equivalent resistance between input 301*a*′ and operating potential −V is equal to the value of resistance element 304′. In this manner, equal time constants are provided for each half cycle of the waveform at output 301*b*′, whereby a square-wave, of step-selectable amplitude, is provided thereat. The oscillator square-wave amplitude is inverted by device 554 to allow the leading edge rise time to be controlled by resistance 555 and capacitance 556. The amplified signal is provided at circuit output 210*a*′** with reference to ground potential.

In the particular illustrative embodiment, the controlled load (a fluorescent lamp and ballast) requires a zero to six peak volt range for controlling the "on" load output (light) range. However, the ballast will only turn the load off upon receiving a ten volt peak signal. If a convenient magnitude of operating potential −V (e.g. −15 volts) is utilized, the peak "off" voltage required at output 210*a*' can not be realized with a square-wave output waveform. Therefore, the "off" signal is provided by a pulse voltage, provided essentially at the repetition rate of the "on" square-wave. This pulse is produced by enabling the $O_5$ output of microcomputer 214'. When the $O_5$ output is thus connected to ground potential, resistance element 520 is effectively in parallel connection with resistance element 304', whereby the normal square waveform at output 301*b*' is changed to an asymmetrical pulsed waveform, having a peak amplitude essentially equal to the operating potential magnitude. The duty cycle of this pulse waveform is chosen such that the waveform at output 210*a*' is asymmetrical about 0 volts, due to coupling capacitance 562, and with approximately a 10 volt positive level and a two volt negative level. This waveform is sufficient to turn "off" the particular load connected to output terminal 210*a*'. Utilizing a pulsed waveform for load turn-off, transistor 554 provides the necessary signal inversion to provide the amplifier output waveform leading edge with a rise time limited by capacitance element 556 and by the constant current source (comprised of transistors 546 and 547) necessary to properly bias output transistors 552 and 553 to assure maximum output swing in this "off" pulsed condition.

Operation of the control module embodiment 210' will now be explained with reference to the flow charts in FIGS. 8*a*–8*j*, in addition to the schematic diagrams of FIGS. 7 and 7*a*; additional operational information may be had by reference to application Ser. No. 267,328. Upon application of power to control module 210', the start-up network connected to the INIT input directs the microcomputer to a preselected address in ROM. This address is at location 0 of page F of chapter 0 of memory (step 570 of FIG. 8*a*). From the START step 570, the microcomputer commences the first operational sequence, at step 575, by clearing the RAM memory through a ZMEM subroutine. Once the random-access memory has been initialized, to clear all data randomly set therein during the powering-up of the control module, the program branches to location 0 of page 0 of chapter 0 and commences the initialization (INIT) routine starting at step 580. In a first sequence, the input/output is initialized by first setting a status latch (step 581) and then turning the controlled load to the "off" state (step 582). The ADC 16' is reset (step 583) such that readings are not made of the sensor 212, e.g. a photocell, during the initialization routine. The incoming data line is "freed" by commanding the controller microcomputer to ignore all data at the received-data input port R0 (step 584). The sequence now enters a comparison step 585, in which, with all of output lines R3–R6 disabled, the state of the local control interface inputs, via diodes D1 and D2, are checked. If either of the K1 or K2 inputs is enabled, indicative of a closure of one of switch means 211', step 585 indicates that at least one input is active and the sequence exits back to INIT step 580. The loop is continued until step 585 indicates that there are no active inputs, and the "initialization of input/output" sequence is complete.

The program now "reads and stores the physical address", assigned to the particular control module, by entering step 587, wherein the address programmed by the 12 diode-link combinations A0–A11 is read. Reading of the physical address is accomplished by initially enabling the R4 output line, whereby those diode-link combinations having complete links, e.g. such as the diode-complete link series arrangement for bit A0, provide a logic 1 at the associated one of the K1–K8 inputs, for the associated one of the first four address bits A0–A3. If a diode-link combination has been preprogrammed as by causing disintegration of the associated link (as shown for bit A1) a logic 0 is present at the associated input line. After reading the first four address bits, output line R4 is disabled and output line R5 is enabled to read the next group of four address bits A4–A7, into the microcomputer 4-bit input port. Thereafter, output line $R_5$ is disabled and output line R3 is enabled to read the two bits A8 and A9 of address data into the K1 and K2 inputs of the microcomputer. The R3 line is then disabled and the R6 line is enabled to read the last two bits A10 and A11 of the address data. These serial-presented groups of parallel address bits are assembled into a 12-bit word. The microcomputer now enters step 588 and again checks for any active inputs. If inputs are active, the address word previously obtained may contain erroneous bits and therefore the program loops back to INIT step 580. If there are no active inputs, the address word has been properly read and step 589 is entered, wherein the 12-bit word is stored in a preselected RAM location. This physical address is to be recalled from the preselected location for comparison against the address portion of all transmissions subsequently received by the control module, to identify when the particular control module has been addressed by the central controller. The physical address is also utilized in all transmissions from the particular control module to the central controller, to identify that particular control module then transmitting data. On completion of step 589, the reading and storing of the physical address is complete.

The Initialization routine then enters a series of steps which "initialize the microcomputer flags and set a logical address" in memory. The logical address allows a block, map or sector, each containing at least one control module, to be addressed, as a group, by assigning the same logical address to all control modules in a defined block, a defined map, or a defined sector. Further information as to block, map and sector addressing may be found by reference to the aforementioned U.S. Pat. No. 4,213,182 and application Ser. No. 089,478. Illustratively, as a 12-bit address (one of 4096 different combinations) may be assigned, if an individual control module is assigned one of only 256 possible physical addresses (corresponding to one distinct combination of eight address bits), and the additional upper four address bits are all set to a logic one level, 256 logical addresses can be utilized. Thus, if the most significant four bits are set to logic one levels, the least significant eight bits may be subsequently utilized for logical addresses. Illustratively, the logical address may be established at a default state of 4095 (decimal) corresponding to the hexadecimal address "FFFF", wherein all of the address bits are a binary one, or may be any assigned eight-bit address. In addition, a universal address may also be assigned, whereby, upon receipt of the particular 12-bit universal address, all control modules respond. Thus, a particular control module may respond to: its unique physical address; at least one logical address utilized for block, map or sector addressing; or a universal address for controlling all control modules connected to a central facility.

The flag and logical address initialization sequence thus starts with step 591, in which the various microcomputer flags are set to preestablished initial conditions. In step 592, output line R2 is enabled to enable ADC 216' to read sensor 212'. Illustratively, control module 210' is utilized in a fluorescent lighting system wherein sensor 212' is a photocell, utilized to provide data as to the illumination-output condition of the ballast-lamp load connected to load bus **210*a'*. Thereafter, the initial switch-on level is determined in step 593. The maximum level MAXON is set to 100 percent and stored in the RAM; the controller microcomputer enables output line R6, and reads the condition of the diode-link combinations designated %0 and %1 at the respective K1 and K2 inputs. Thus, by assigning specific switch-on levels to each of the diode-link combinations, a quick-on feature may be provided when the local control switch means 211' is utilized, as hereinbelow set forth in more detail. Briefly, if the links associated with the %0 and %1 multiplexer input branches are both intact, a first level, e.g. 50 percent of maximum load, may be immediately implemented upon recognition of closure of the "on" side of the switch means (e.g. to input 222*a'*). If the link in the %0 branch is open, a binary 0 level at the K1 input and a binary 1 level at the K2 input (provided by the completed link in the %1 branch) may set the initial switch-on level at another value, e.g. 30 percent. Similarly, if the link associated with the %1 branch is open, while the link associated with the %0 branch is complete, a third switch-on initial level, e.g. 60 percent, may be established. Finally, if both links are open, a fourth initial switch-on level, e.g. 100 percent, may be preselected. Thus, by reading the states of K1 and K2 inputs with the R6 output enabled, the initial switch-on level can be determined in step 593. In step 594, the load (lamp) is turned on to some initial controlled value, e.g. 25 percent of maximum output. The logical address is set to a preselected value, e.g. decimal 4095, in step of 595, and the initialization sequence is completed. The program now enters loop node 600**.

A main, or executive, loop sequence commences at loop node 600. In decision step 601, it is determined whether the load (lamp) is in the "on" state or the "off" state. If the lamp is in the "off" state, the routine proceeds to step 602, wherein photocell sensor 212 is disabled, by disabling controller microcomputer output line R2. If the load lamp is in the "on" condition, the data input line is enabled in step 603, by enabling controller microcomputer output line R0. This enables the control module to receive data from the central controller and also releases the data bus **210*c'* if data transmitter 475 had previously captured the bus. At the completion of either step 602 or 603, step 604 is entered and a watch-dog timer, implemented in controller microcomputer 214', is toggled to allow external circuitry (not shown) to determine whether the control module is exercising the main loop properly. Next, the "message pending" flag (MSGP) is tested (step 605). If the MSGP flag is set (binary 1), the control module goes to the message transmission routine (TMSG) in step 610 (described in FIG. 5*j* of application Ser. No. 267,328). If the MSGP flag is not set (a binary 0), the control module proceeds to step 615, wherein the controller microcomputer input K lines are tested for activity. If any of the K inputs are active, the program progresses to the read-input (INPT) mode 620. Thereafter, the program enters step 621, wherein the bits of data at the four K inputs are read by controller microcomputer 214' and stored in a predesignated area of RAM. The inputs are then tested, commencing at step 622, wherein the central controller data bus 210*c'* activity is tested. If the voltage across bus 210*c'* is low, indicative of a possible transmission from the central controller, the controller microcomputer checks a "time-out" flag. If the time-out flag is set (a "no" decision in step 622), the controller microcomputer assumes that the central controller data bus is either stuck or disconnected from the control module and continues through an INPTØ node 623, on to step 623*a*. If the time-out flag is not set (a "yes" decision in step 622), an INPT2 node 624 is traversed and a decision step 624*a* is entered and the central controller data bus is checked for being in a stuck-low condition. If the bus is not stuck low, a transmission from the central controller is occurring and step 625 is proceeded to, calling the transmission-read subroutine BLSL described in FIG. 5*h* of application Ser. No. 267,328. If the central controller data bus was found, in step 624*a*, to be stuck low, step 626 tells the controller microcomputer to reset the stuck bus and proceed to node 623. An input testing routine starts with decision step 623*a*, wherein the "off" condition of all local control switch means 211' is tested, by ascertaining the binary state of the local control interface means output 222*a'*. If this output is a logic one, indicative of a local switch being engaged in the "off" condition, the program calls the off/down switching subroutine OFDSW (of FIG. 8*c*, discussed hereinbelow). If the off switches do not require service, the dim flag DMFLG is reset in step 631 and comparison 632 is entered. In step 632, the condition of all local control "on" switches is tested by checking the logic state of the remaining local control interface means output 222*b'*. If a logic level exits at this output, at least one local "on" switch is active and the program calls the on/up switching routine ONUSW of step 635 (FIG. 8*d*, discussed hereinbelow). If the local "on" switch in not active, step 632 resets a bright flag BRFLG, in step 636, and continues to decision step 637. In step 637 the sensor (photocell) bus activity is checked and if the photocell input to the control module is active, step 638 is entered, wherein the photocell is reset. The program, in step 639, transfers to the PCELL node 640, of the PCELL subroutine of FIG. 8*b*. If, in step 637, the photocell was not active, or if, in step 615, the K inputs were not active, the program transfers to the TPCEL node 641. The photocell flag PCFLG is tested in decision step 642, to ascertain whether the photocell sensor is enabled. If the sensor is disabled, the program branches back to the loop node 600 and the main loop is executed once again. If the photocell is enabled, step 642 calls the photocell sensor PCELL subroutine of step 645 (shown in FIG. 5*b*** of application Ser. No. 267,328).

The off-dim switching subroutine OFDSW of node 630 (FIG. **8*b*) is called when an "off" switch closure is detected. In step 672, the controller microcomputer is utilized for the debouncing of the switch contact closure. The central controller bus is again checked, in step 673, and if the bus is active, the program returns to loop node 600. If the bus is not active, step 674 is entered and the K inputs are again checked for an "off" switch closure. If the "off" switch has not been pressed, the program exits to loop node 600. If the "off" switch is pressed, a reset flag is cleared, in step 675, and step 676 is entered to determine whether the load (lamp) is in the off condition. If the lamp is in the off condition, no further action is necessary upon the local "off" switch closure, and step 676 exits to loop node 600. If the load is on, the bright flag BLFLG is reset, in step 677 and the dim flag DMFLG is tested in step 678. If DMFLG is set, control branches to the dimming routine DIM of step 670 (FIG. 8***d*). The DIMFLG would be set if, during the DIM routine, the control module had been interrupted by a message from the central controller; this allows dimming to continue after message reading and decoding. If DMFLG is not set, step 678 proceeds to step 679, wherein a one-half second wait occurs. After the one-half second delay, the central controller bus activity is again checked in step 622'. If the bus is active, the INPT2 subroutine (step 624) is called. If the bus is not active, the CLFLG flag is cleared in step 680 and the off-switch is checked (step 681) for continued closure. If the off switch is no longer pressed, signifying that the user requested the lamp to be shut off, step 682 is entered, the lamp is turned off, and the program returns to loop 600. A continued pressing of the switch in the "off" condition, in this embodiment, after a one-half second wait is indicative that the user is requesting the lamp be dimmed, but not shut off. Accordingly, the DIM dimming subroutine of step 670 (FIG. 8*d*) is called.

It will be seen that control module 210', when utilized in a lighting control system, operates whereby the lamp may be turned immediately off with a short-time-interval activation on the "off" side of the switch and may be dimmed with continued "off" switch activation. Similarly, the lamp level may be increased (brightened) by continued pressure on the opposite, or "on", portion of the switch. A short time interval of "on" portion activation is interpreted as an immediate on signal, as utilized in the on-up switching subroutine ONUSW, commencing at step 635 of FIG. 8*c*.

When the ONUSW subroutine step 635 is called, the computer initially debounces the "on" switch closure, in step 684, and then checks the maximum level MXLVL to ascertain if it is currently set to the zero level, in step 685. If the zero level is set, the load can neither be turned on nor increased, and the program exits to loop node 600. If the MXLVL is not set to zero, step 686 is entered and the activity of the central controller bus is again checked. If the bus is active, the program returns to loop node 600. If the bus is not active, decision step 687 is entered and the state of the "on" local control switch means is checked. If the "on" switch means is not pressed, an on or up switching condition is not required and step 687 again exits to loop node 600. However, if the "on" switch is pressed, step 687 exits to step 688, wherein the dim-flag DMFLG is cleared and the status of the bright-flag is checked in step 689. If BRFLG is set, the lamp can be brightened one level and the program clears the CLFLG flag (step 689*a*) and then goes to the BRITE subroutine node 665 of FIG. 5*f*. If BRFLG is not set, the reset flag is cleared in step 690 and step 691 is entered to test the on/off condition of the load (lamp). If the load is off, step 692 is entered and both the ON and CLFLG flags are set, before step 692*a* is entered and the initial level data, given by the condition of the fusible links for the %0 and for the %1 diode-link combinations, is obtained. The initial level INLVL data is compared against the maximum level MXLVL, in step 693, and if the initial level is greater than the program maximum level, step 694 is entered and the command level CLVL data is set to the MXLVL amount. If the initial level is not greater than the maximum level, step 695 is entered and the commanded level CLVL is set equal to INLVL. Having now set the commanded level CLVL, in one of steps 694 or 695, the commanded level data is output in step 696. Step 697 is entered and the photocell is enabled. A wait of two seconds occurs in step 698, before step 699 is proceeded to. If, however, in step 691 the lamp was found to be on, a wait of one-half second (step 679') occurs and the activity of the central controller bus is checked in step 622'. If the bus is active, step 700 sets the BFGLG flag and calls the INPT2 subroutine (step 624 of FIG. 8*a*). If the bus is not active, the sequence proceeds to step 699. Step 699 again checks for a closure of an "on" local switch. If the switch is no longer closed, no further change in light level is required and the program exits to node 600. If the switch is still closed, a further increase of the load level is requested and the routine exits to BRITE subroutine node 665 of FIG. 8*e*.

If the load level is to be decreased (load lamp output to be dimmed) the DIM subroutine commencing at node 670 (FIG. 8*d*) is utilized. In a first step 701 a "command" flag CMDFL is tested. If the flag iz not set, the closed-loop flag CLFLG is tested in step 702. If CLFLG is also reset, step 703 is entered and a switch constant SWCNST (which will be used for determining the speed of the slow level-change) is obtained from RAM. Thereafter, or if either CMDFL or CLFLG is set, the current load level CLVL is tested (step 704) for equality to a minimum allowable load level MINLVL. If CLVL equals MINLVL, step 705 checks for a closed output-under-photocell-control loop. If this loop is open, step 706 is entered and the photocell is disabled. if the loop is closed, step 706 is bypassed. Thereafter, a "set maximum" flag SMXFL is tested in step 707. If SMXFL is a logic one, the maximum level has been set to a level which is lower than the current level, and the program exits to loop node 600. If SMXFL is set to a logic zero, the central controller bus activity is again tested in 708 and, if active, the DMFLG flag is set in step 709 and the INPT2 subroutine (node 624 of FIG. 8*a*) is called. If the data bus is not active, step 710 is entered and the local control "off" switch input is again checked; if the switch is not pressed, the dimming flag DMFLG is reset in step 711 and the program returns to node 600. If the local control off switch is still pressed, the program returns to step 670 at the start of DIM subroutine. If, at step 704, the commanded level was found to be other than the minimum allowed level, step 713 is entered and CLVL is decremented by one level to establish a new level NLVL=CLVL-1. The lamp output LMPOUT subroutine of step 715 (FIG. 8*f*) is called.

The lamp output LMPOUT subroutine (FIG. 8*f*) is used to effect a slow level change between two levels, in accordance with the principles of this invention, in response to one of: a sensor (photocell) request, a central controller request, or a local control switch closure request. In first subroutine step 716, the speed constant, associated with SWCNST, is obtained from memory; the value of this constant will differ depending on whether the level change is due to a central controller command, a local control switch closure, or a sensor (photocell) output change when the control module is operating in the closed-loop mode. Once the timing constant is obtained, the control module sends the "old", or current level, to the load, in step 717, for a specific number of cycles of the oscillator 230' waveform. As the level change is to be accomplished in accordance with the above described methods, a counter in microprocessor 214' is initialized for both the old CLVL and new NLVL counts. The subroutine proceeds to step 718, where the count in the CLVL, or "old", counter is checked. If time still remains for sending the CLVL level, the subroutine returns to step 717. After the required number of oscillator cycles are transmitted at an analog level associated with the old CLVL levels, step 718 verifies that the CLVL count is zero and step 719 is entered. At this time the new NLVL level is transmitted as an associated amplitude of a waveform including that number of oscillator cycles determined by the time count in the new level counter. Step 720 checks the status of the new level counter and returns to step 719 if the required number of cycles have not yet been transmitted. Once the required number of NLVL amplitude cycles have been transmitted, step 720 exits to step 721. In step 721, the count in the old CLVL counter is checked, and if still greater than zero, step 722 is entered, wherein the new NLVL counter is incremented by one count. In step 723, the old CLVL counter is decremented by one count. The routine now returns to step 717. The loop of steps 717–723 is repeated, as the number of old CLVL amplitude cycles decreases and the number of new NLVL amplitudes cycles increases, until the contents of the old CLVL register is equal to zero, at step 721. At that time, the current level is set equal to NLVL and, in step 725 the subroutine returns to that point in the program from which the LMPOUT subroutine node 715 was called.

Returning to the the DIM procedure of FIG. 8*d*, after the LMPOUT subroutine ends and the program returns to the end of step 715, the SMXFL flag is again tested in step 726, and if set to a logic zero level, the central controller bus activity is checked in step 727. If the bus is active, DMFLG is set in step 728 and the INPT2 subroutine node 624 is called. If the bus is not active, a local control off switch closure is checked for in step 729. If any of the local control off switches are closed, the routine returns to the beginning DIM node 670. If a local off switch is not still pressed, or if (in step 725) SMXFL was set to a logic one, step 730 is entered and the state of the closed loop flag CLPFLG is checked. The test in step 726 is to ascertain whether dimming is taking place due to a change in maximum allowable level; such a change occurred if the set-maximum flag is set to a logic one level and did not occur if the set-max. flag was reset to a logic zero level. Step 730 is a test to ascertain whether dimming is occurring due to a photocell request in the closed loop mode. If CLPFLG is not set, the photocell is disabled in step 731. However, if the CLPFLG is set, the photocell is active, and step 731 is bypassed. The dimming flag DMFLG is cleared in step 732 and the command flag CMDFL is tested in step 733. If the command flag is reset, the program returns to loop node 600; if the command flag is set to a logic one level, indicative of a level change having been commanded by the central controller, the routine branches to the SLOV2 node 735 of a slow-level change routine (FIG. 8*i*).

Figure 8A:
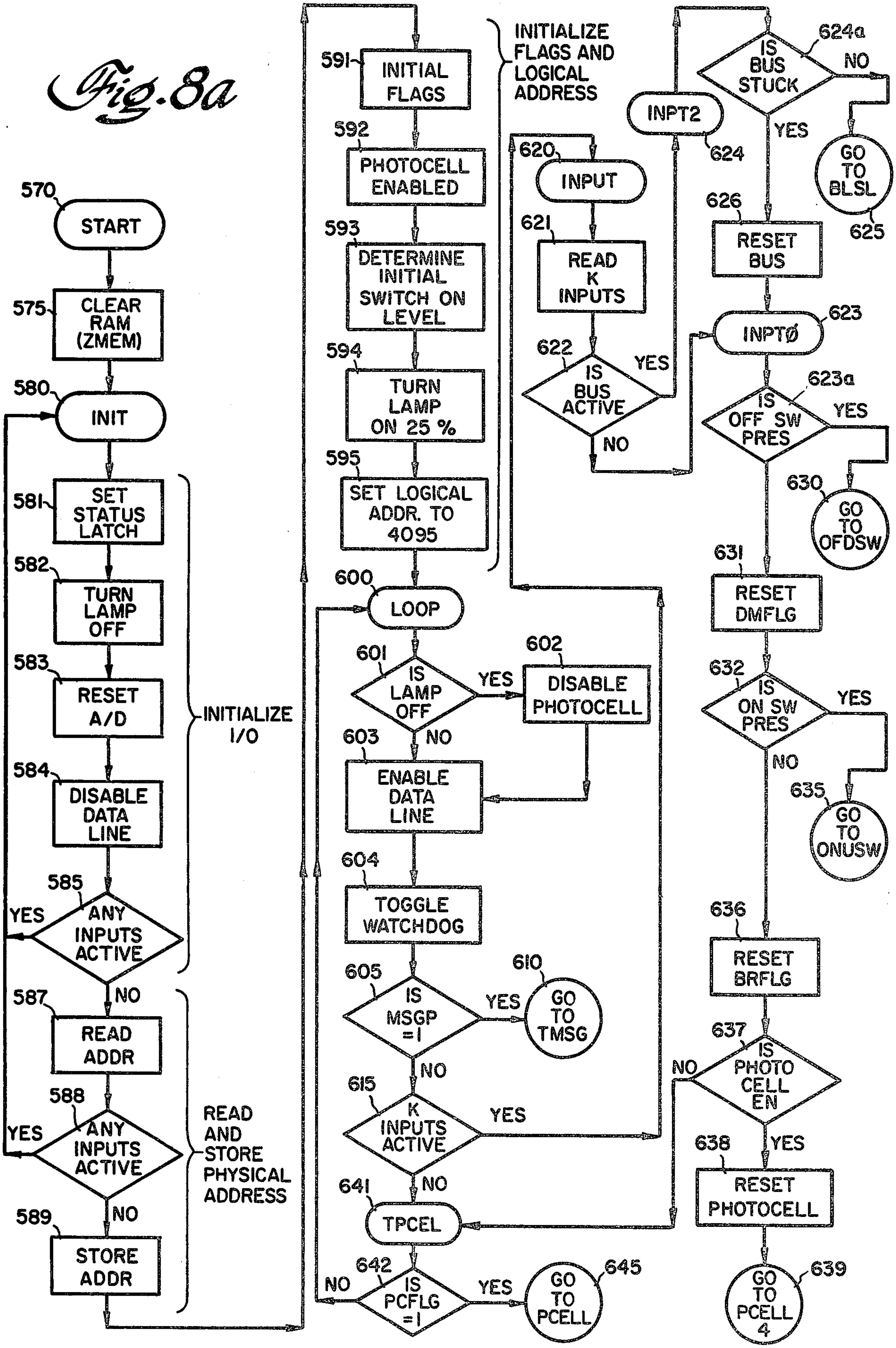
Figure 8B:
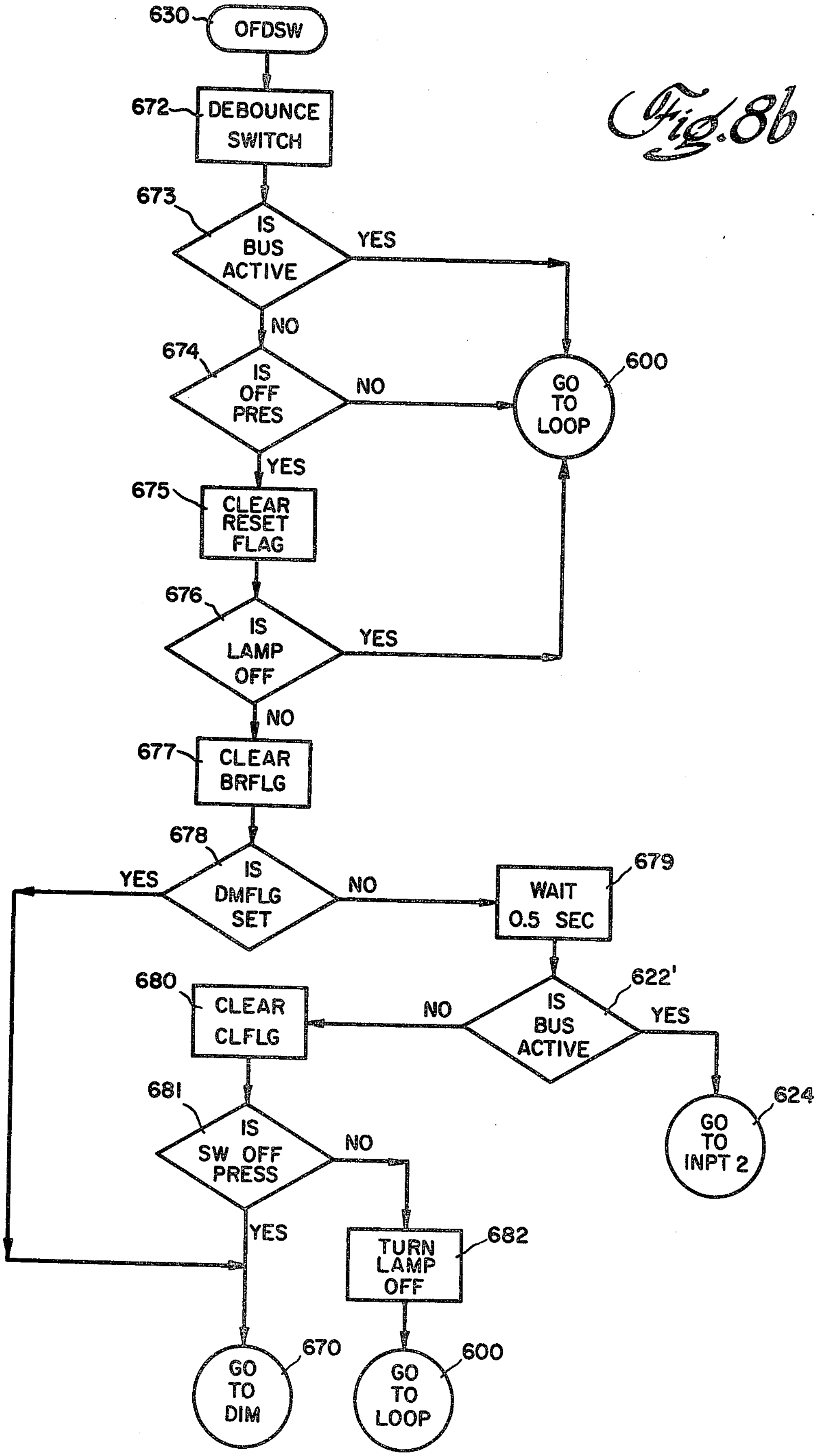
Figure 8C:
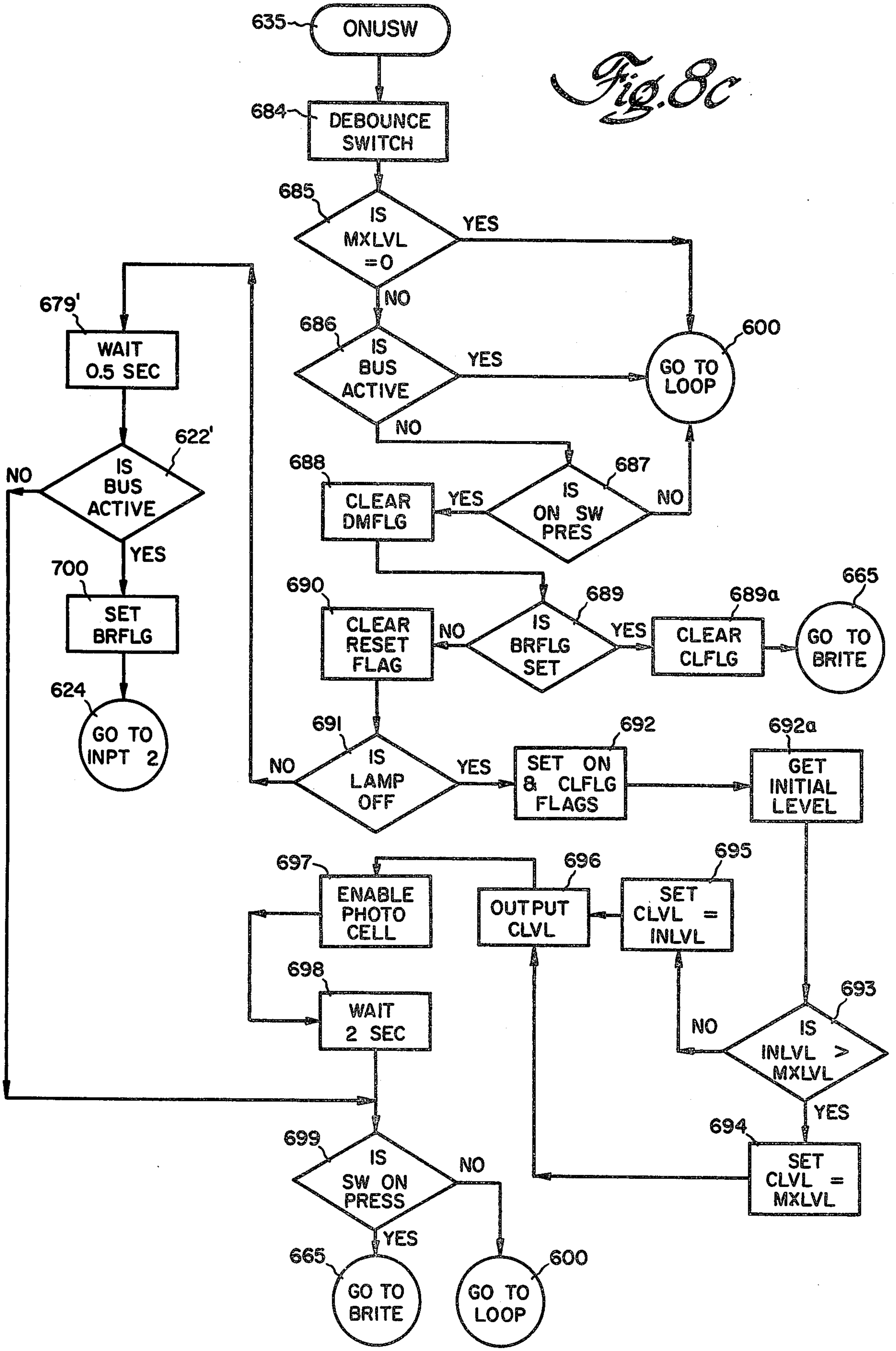
Figure 8F:
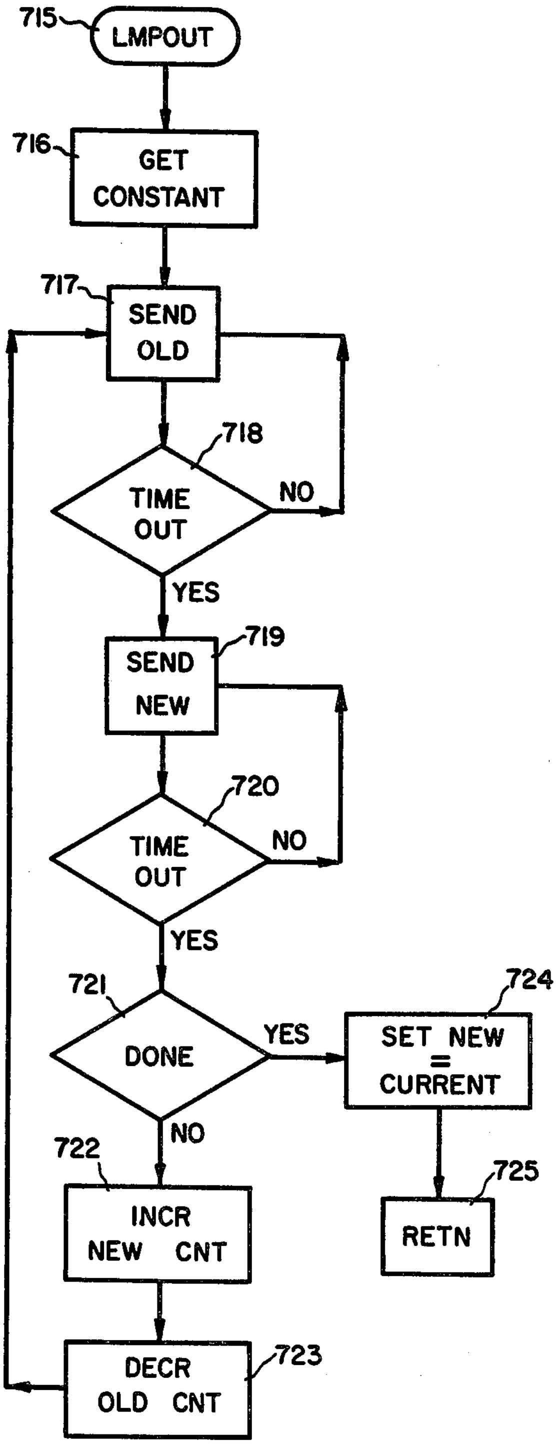

If a load level increase has been commanded, the load-level-increase BRITE routine node 665 (FIG. 8*e*) is called. The routine commences by testing the command flag CMDFL in step 737. If the command flag is not set, the closed-loop flag CLFLG is tested in step 738. If the closed loop flag is also reset, the reset flag is cleared in step 739 and the switch contant SWCNST is set to the appropriate speed for use with the local control switch, in step 740. Thereafter, or if the command or closed loop flags were found to be set in respective steps 737 or 738, step 741 is entered to test whether the current level CLVL is less than the maximum allowable MXLVL. If the current level is not less than the maximum allowable level, the photocell-control loop is checked (step 742). If the loop is open, the photocell sensor is disabled (step 743) and step 744 is then entered. If the photocell is active, step 742 goes directly to step 744. Central controller bus activity is then checked in 744. If the bus is active, indicating an interruption by the central controller of the BRITE subroutine, the brite flag BRFLG is set in step 745, as control passes to the INPT2 node 624 (FIG. 8*a*). If the bus is inactive, step 746 is entered and the closure of the local control "on" switch is tested. If the "on" switch is still being pressed, the program returns to node 665 at the start of the BRITE program. If the "on" switch is no longer being pressed, the brite flag BRFLG is cleared in step 747 and the program returns to loop node 600.

If the current level was found to be less than the maximum allowed level in step 741, step 748 is entered and the current level CLVL data is incremented by one level to obtain the new level NLVL data. The slow-change method of the present invention is then carried out by calling the LMPOUT subroutine at node 715 of FIG. 8*f*. When the LMPOUT slow-change routine is finished, the program returns to step 749, wherein the central controller bus activity is again checked. If the bus is active, the brite flag BRFLG is set, in step 750, and the INPT2 node 624 is called. If the bus is not active, the local "on" switch presence is again checked, in step 751, and if still present, the routine returns to the BRITE node 665, as the user requests further increases in the light level. If the "on" switch is no longer being pressed, indicative of the user having found a present load (light) level acceptable, the "closed loop" flag CPLFLG is checked, in step 752, to see whether the load level increase was due to a sensor (photocell) change. If the CLPFLG flag was reset, step 753 disables the sensor (photocell). If the CLPFLG flag was set in step 752, or after disabling the photocell sensor in step 753, step 754 is entered and the BRFLG "flag" is cleared. The "command" flag CMDFL is tested in step 755 to determine whether the load level increase was responsive to a control command from the central controller. If the CMDFL is set (to a logic one level), the program branches to step 735, the SLOLV2 routine of FIG. 8*i*, whereas if CMDFL was reset (to a logic zero level) the program returns to main loop node 600.

Figure 8G:
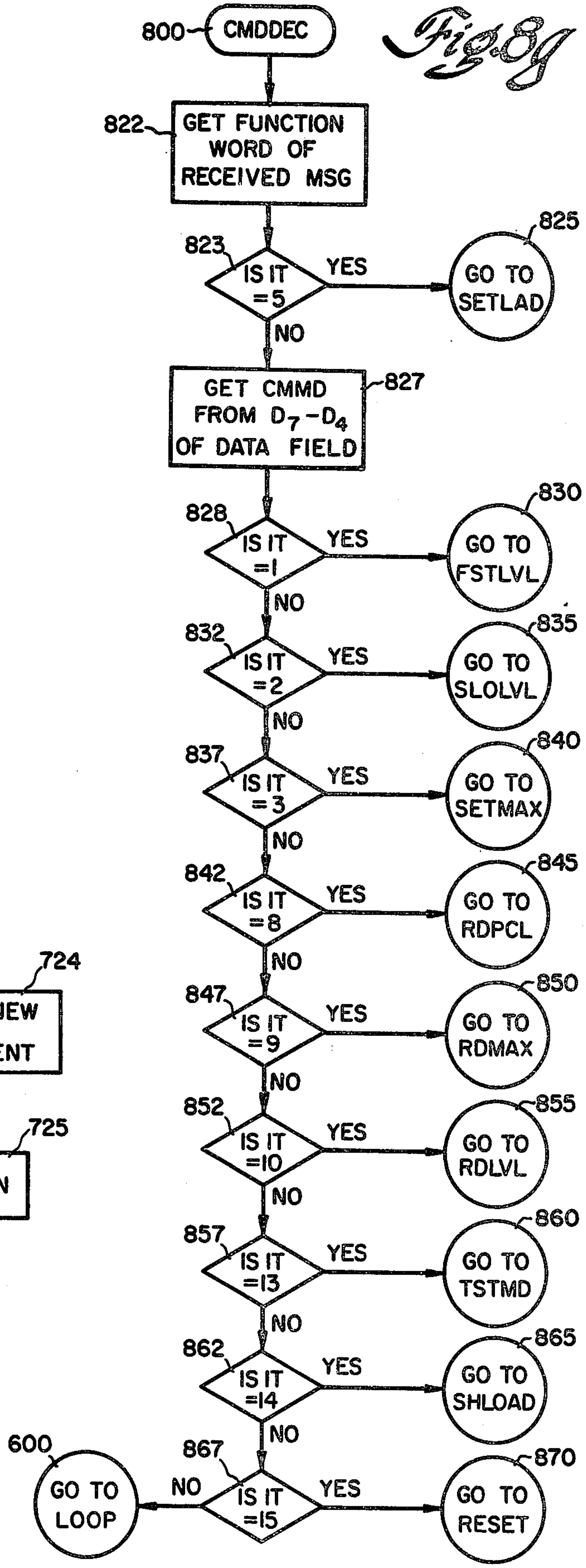

The CMDDEC subroutine for decoding central controller bus commands is shown in FIG. 8*g*. The CMDDEC node 800 is entered when a message, addressed to the particular control module, is received and requires a listed control function to be performed. The function word of the received message has been stored in a reception buffer RBUF in RAM and is retrieved therefrom in step 822. The value of the function word is checked, and if the value is found to be equal to decimal 5 (step 823) the SETLAD subroutine of step 825 (FIG. 5*l* of application Ser. No. 267,328) is called to reset the particular control module logical address to a new value. If the function word value is not equal to 5, step 827 is entered and the command data (CMMD) is obtained from the upper four bits $D_7$–$D_4$ of the data field. The subroutine now has both a command number and an associated command data word. If the command number is equal to 1 (step 828), the fast-level-change subroutine FSTLVL node 830 (of FIG. 8*h*) is called. If the command number is 2 (step 832), the slow-level-change SLOLVL subroutine node 835 (of FIG. 8*i*) is called. If the other command numbers are received, the program branches described in application Ser. No. 267,328 occur.

Receipt of a command number 1 causes the program to branch to fast-level-setting subroutine node 830 of FIG. 8*h*. The FSTLVL subroutine commences with step 873, wherein the desired output level is data obtained from the lower four bits $D_3$–$D_0$ of the data field in the received central controller command message. This new level NLVL is compared with the previously established maximum allowable level MXLVL data and, if NLVL is less than MXLVL, the photocell is disabled in step 875, preparatory to an output level change. If NLVL is not less than MXLVL, the data value of NLVL is set equal to the value of MXLVL, in step 876, and the photocell is thereafter enabled in step 877. After operating upon the photocell sensor state in either of steps 875 or 877, comparison step 878 is entered and the new level NLVL data is checked for a zero level. If a non-zero NLVL level exists, then the on/off flag is set in step 879, while if a zero NLVL exists, then the on/off flag is cleared in step 880. After the on/off flag is operated upon, step 881 is entered and the NLVL data is output to the load and thereafter the current level CLVL data is set equal to the new level NLVL data and stored in memory (step 882) prior to the program returning to loop node 600. It will be seen that this fast-level subroutine immediately changes the present load output level to be that of the newly commanded level, in accordance with the method set forth hereinabove with respect to FIGS. 2*a* and 2*b*.

If the central controller has commanded a slow level change, the SLOLVL node 835 (FIG. 8*i*) is entered and the on/off state of the load (lamp) is initially checked in step 891. If the load (lamp) is off, no level change can occur and control branches back to loop node 600. If the lamp is in the on condition, the new level NLVL data is obtained (step 892) from the incoming data buffer, and is checked to see if a zero level is commanded (step 893). If the commanded new level NLVL data is equal to zero, it is automatically incremented to the first non-zero level in step 894. The new level data is then compared, in step 895, with the maximum allowable level MXLVL. If the new level is less than the maximum allowable level, then the photocell sensor is disabled in step 896; while if the new level data is not less than the maximum allowable level, then the new level data is modified in step 897 to be equal to the maximum allowable level MXLVL and the photocell sensor is thereafter enabled (step 898). After the photocell sensor operation in step 896 or 898, the SLOLVO node 900 is entered. This node is also entered if the SLOLV 2 subroutine node 735 had been previously called in the DIM or BRITE subroutines, but after placing the new level data in the accumulator register of the controller microcomputer (step 903). From node 900, the program continues to a step 908 in which the central controller bus 210*c'* is disabled to allow the control module to complete its load level change without interruption from the central controller. After disabling the central controller bus, the new level NLVL is checked, in step 909, for equality to the current level CLVL. If equality exists, the CMDFLG is reset (step 911) and the SETMX flag is also reset (step 912) before the program returns to main loop node 600. If the new level is not equal to the current level, step 913 is entered and a check is made to determine whether the new level is less than, or greater than, the current level. If the new level is less than the current level, the SLOLV1 routine (FIG. 8*j*) is called (step 914). This subroutine, commencing of entry node 915, first saves the new level data (step 916), then sets the CMDFLG flag in step 917, and also sets the required constant PLCNST, which will be used in the slow-change LMPOUT routine, to that value associated with a central-controller-requested level change (step 918). The subroutine then returns (step 919) to the end of CALL step 914 and, as the new level is less than the current level and requires a load level decrease, goes to the DIM subroutine node 670. If, in step 913, the new level was found to be greater than the current level (requiring a load level increase) step 920 is entered and SLOLV1 subroutine entry node 915 is again called. After the subroutine is complete, it returns at step 919 to CALL step 920 and the slow level change subroutine ends by calling the BRITE subroutine node 665.

While presently preferred embodiments of our methods for operation of programmable signal control circuits are described herein, it will now become apparent that many modifications and variations may be made without departing from the spirit and intent thereof. It is our intent, therefore, that we be limited only by the scope of the appending claims and not by specific details or instrumentalities described herein.

What is claimed is:

1. A method for controlling the output amplitude of a waveform generator having a plurality of individually selectable discrete output amplitudes and a desired frequency; in which data corresponding respectively to said plurality of output amplitudes, a predetermined integer N, a predetermined integer K, and a predetermined initial value of an integer M are stored in a computer memory; comprising the steps of:

(a) transferring from said computer memory to a control circuit for controlling said waveform generator data corresponding to a first one of the plurality of output amplitudes;

(b) operating the generator at said first output amplitude;

(c) transferring from said computer memory to said control circuit for controlling said waveform generator data corresponding to a second one of the plurality of output amplitudes;

(d) retrieving data corresponding to said integer K and N from said computer memory;

(e) calculating a number N' of time intervals by dividing N by K, each containing N cycles of said generator waveform, where N' is another integer equal to (N/K);

(f) retrieving from said computer memory data corresponding to said initial value of said integer M;

(g) operating the generator at said second output amplitude for M'=KxM waveform cycles and at said first output amplitude for the remaining (N-M') cycles;

(h) increasing the value of M to the next successive value in a range of integer values from 1 to N, at the completion of each of the N' time intervals;

(i) repeating steps (g) and (h) for each of N′ time intervals; and (j) operating the generator continuously at said second output amplitude after completion of all of said N′ time intervals.

2. The method of claim 1, wherein step (d) comprises the step of retrieving from said computer memory a value of 0 for N; whereby operation of said generator is transferred immediately to step (j).

3. The method of claim 1, wherein K=1; and M′ increases in integer steps from 1 to M in each of M′=N successive time intervals.

4. The method of claim 1, wherein the M′ cycles of second output amplitude waveform occur at the start of each of the N′ time intervals.

5. The method of claim 1, further including the step of obtaining a D.C. output level responsive to the waveform output amplitude, said level gradually changing from a first magnitude, associated with said first output amplitude, to a second magnitude, associated with said second output amplitude, over said N′ time intervals, if N′ is greater than zero, and abruptly changing from said first level to said second level, if N′ is equal to zero.

6. A method for substantially smoothly varying a D.C. signal between a first amplitude and a second amplitude in a system comprising a waveform generator having a plurality of individually selectable discrete output amplitudes and a desired frequency, and a system memory for storing data corresponding respectively to said plurality of output amplitudes, a predetermined number N of the frequency cycles of the generator waveforms and a predetermined integer K, comprising the steps of:

(a) calculating an integer number N′ equal to (N/K) of time intervals, each of the N′ time intervals containing an integer number N of the frequency cycles of the generator waveforms;

(b) supplying the peak output amplitude of the generator waveform over each of the plurality N′ time intervals to a charge storage element having a time constant much greater than the time for one cycle of said frequency cycles to provide the D.C. signal amplitude;

(c) operating the waveform generator at a first output amplitude during all of the N waveform cycles of the first one of said time intervals to cause the D.C. signal amplitude to be at said first D.C. signal amplitude;

(d) then operating the waveform generator at a second output amplitude during sequentially increasing numbers of waveform cycles at the beginning of sequential ones of said time intervals to cause the D.C. signal amplitude of said charge storage element to be at said second D.C. signal amplitude;

(e) operating, during the remainder of cycles during each of the time intervals, the waveform generator at said first selected amplitude, to cause said D.C. signal to substantially smoothly vary from said first amplitude to said second amplitude; and (f) thereafter operating the waveform generator only at said second output amplitude, to maintain said D.C. signal at said second amplitude.

7. A circuit for providing output signal of amplitude controlled responsive to the data contained in an externally-provided digital control signal, comprising:

oscillator means for providing a periodic waveform having a selected frequency and a substantially constant amplitude;

an operational amplifier having an inverting input, a non-inverting input and an output;

first voltage divider means for providing the output waveform of said oscillator means to a selected one of said operational amplifier inverting and non-inverting inputs with an amplitude selected of a first plurality of selectable values, each less than the substantially constant amplitude of the oscillator means output waveform;

second voltage divider means coupled to at least said operational amplifier output and a remaining one of said inverting and non-inverting inputs, for controlling the gain of said operational amplifier to said signal from said first voltage divider means, to a selected one of a second plurality of selectable values;

means coupled to at least one of said first and second voltage divider means for controllably switching the values thereof responsive to said at least one control signal;

a circuit output terminal;

means for recovering a D.C. level responsive to the magnitude of the periodic waveform at said operational amplifier output and for providing said D.C. level to said circuit output terminal as said circuit output signal; and level changing means, connected to said controllable switching means, for substantially smoothly changing the recovered D.C. level from a first D.C. level value, responsive to the data of a first digital control signal, to a second D.C. level value, responsive to the data of a second digital control signal in an integer number N′ of time intervals each containing an integer number N of cycles of said oscillator waveform frequency, by providing (a) all of said N waveform cycles during a first of said time intervals at a first amplitude to yield said first D.C. level value; (b) then providing a sequentially increasing number of waveform cycles at the beginning of sequential ones of said time intervals at a second amplitude which will yield said second D.C. level value, and the remainder of the cycles during each of said time intervals at said first amplitude, until said second amplitude is provided for all N cycles of a time interval; and (c) providing thereafter said waveform only at said second amplitude.

8. The circuit of claim 7, wherein said controllable switching means comprises: first and second latch means each respectively for storing therein the data of the respective first and second digital control signals representative of respective first and second amplitudes and for providing said stored amplitude data to an output thereof responsive to an output enable signal, with both latch means outputs being coupled in parallel to one of said voltage dividers; and said level changing means comprises: first means for counting from zero to an integer at least equal to N; second means for counting from zero to an integer at least equal to N′; said first and second counting means being reset to a zero count responsive to a start signal; said first counting means being coupled to said second counting means in a manner to increase the count in said second counting means by one after each counting of N counts in said first counting means; means for comparing the counts in said first and second counting and for providing an output in a first condition only if the first counting means count is less than said second counting means count and otherwise providing said output in a second condition; means directing storage of data denoting one of said first and second amplitudes in a different one of said first and second latch means; means responsive to said start signal for coupling said oscillator periodic waveform to said first counting means to increase the count therein; and means responsive to said start signal and said comparing means output signal for providing said output enable signal respectively to said first and second latch means when said comparator output is in a respective one of said first and second conditions.

9. A circuit for providing an output signal of amplitude controlled responsive to the data contained in at least one externally-provided digital control signal, comprising:

oscillator means for providing a periodic output waveform having a selected frequency and a substantially constant amplitude;

waveform control circuit means for receiving said periodic output waveform and providing a periodic waveform having a variable amplitude responsive to the magnitude of a first voltage applied to a control input of said waveform control circuit means;

a circuit output terminal; and means for recovering a D.C. level responsive to the amplitude of the waveform control circuit means periodic waveform, and for providing said D.C. level to said circuit output terminal as said circuit output signal;

said waveform control circuit means comprising:

first and second source of circuit operating potential;

a plurality of resistance elements each having a first terminal thereof connected in parallel to the first terminals of all other resistance elements, and each having a second terminal; each said resistance element second terminal being individually connectable to one of said first and second sources of circuit operating potential;

means, connected between said resistance element first terminals and said waveform control circuit means control input, for supplying to said control input said first voltage at an amplitude established by the particular combination of said resistance element second terminals connected respectively to said first and second operating potentials; and means for controlling the connection of said resistance element second terminals to one of said first and second sources of circuit operating potentials to smoothly change the recovered D.C. level from a first D.C. level value, responsive to the data of a first digital control signal, to a second D.C. level value, responsive to the data of a second digital control signal, in an integer number N' of time intervals each containing an integer number N of cycles of said oscillator waveform frequency, by providing (a) all of said N waveform cycles during a first of said time intervals at a first amplitude to yield said first D.C. level value; (b) then providing a sequentially increasing number of waveform cycles at the beginning of sequential ones of said time intervals at a second amplitude which will yield said second D.C. level value, and the remainder of the cycles during each of said time intervals at said first amplitude, until said second amplitude is provided for all N cycles of a time interval; and (c) providing thereafter said waveform only at said second amplitude.

10. The circuit of claim 9, wherein said connection controlling means comprises: first and second means each respectively for storing therein the data of the respective first and second digital control signal representative of the respective first and second amplitudes and for providing said stored amplitude data to an output thereof responsive to an output enable.

* * * * *